(12) United States Patent
Joshi et al.

(10) Patent No.: US 11,436,302 B2
(45) Date of Patent: Sep. 6, 2022

(54) ELECTRONIC SYSTEM FOR COMPUTING ITEMS OF AN OUTER PRODUCT MATRIX

(71) Applicant: International Business Machines Corporation, Armonk, NY (US)

(72) Inventors: Vinay Manikrao Joshi, Zurich (CH); Abu Sebastian, Adliswil (CH); Manuel Le Gallo-Bourdeau, Zurich (CH); Irem Boybat Kara, Zurich (CH); Christophe Piveteau, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 221 days.

(21) Appl. No.: 16/435,248

(22) Filed: Jun. 7, 2019

(65) Prior Publication Data
US 2020/0387563 A1    Dec. 10, 2020

(51) Int. Cl.
*G06F 17/16*    (2006.01)
*G06F 7/58*    (2006.01)

(52) U.S. Cl.
CPC .............. *G06F 17/16* (2013.01); *G06F 7/58* (2013.01)

(58) Field of Classification Search
CPC .. G06F 17/16; G06F 7/58; G06F 7/70; G06N 3/0472
See application file for complete search history.

(56) References Cited

U.S. PATENT DOCUMENTS

| | | | |
|---|---|---|---|
| 9,852,790 B1* | 12/2017 | Gokmen | G06N 3/084 |
| 2008/0294970 A1* | 11/2008 | Gross | H03M 13/1102 |
| | | | 714/801 |
| 2011/0154150 A1* | 6/2011 | Kang | H03M 13/1108 |
| | | | 714/752 |
| 2017/0109628 A1* | 4/2017 | Gokmen | G06N 3/0635 |
| 2017/0255225 A1* | 9/2017 | Lilja | G06F 7/70 |
| 2018/0005110 A1* | 1/2018 | Gokmen | G06N 3/063 |
| 2018/0075338 A1 | 3/2018 | Gokmen | |
| 2018/0189056 A1 | 7/2018 | Turakhia et al. | |

OTHER PUBLICATIONS

A. B. Yuan, Y. Wang and Z. Wang, "Area-Efficient Scaling-Free DFT/FFT Design Using Stochastic Computing," in IEEE Transactions on Circuits and Systems II: Express Briefs, vol. 63, No. 12, pp. 1131-1135, Dec. 2016, doi: 10.1109/TCSII.2016.2603465. (Year: 2016).*

(Continued)

*Primary Examiner* — Emily E Larocque
*Assistant Examiner* — Huy Duong
(74) *Attorney, Agent, or Firm* — Daniel Morris; Otterstedt, Wallace & Kammer, LLP

(57) ABSTRACT

The present disclosure relates to an electronic system for computing items of an outer product matrix, for each item of at least part of the items of the matrix. The system is configured to receive a pair of real numbers of two vectors, the pair corresponding to the item. The system is further configured to compute a stochastic representation of the real numbers resulting in two sets of bits, the set of bits comprising a subset of bits representing the real number and a sign bit indicative of the sign of the real number. The system is further configured to perform a sequence of digital operations using the two sets of bits to provide a representation of the item.

18 Claims, 20 Drawing Sheets

(56) References Cited

OTHER PUBLICATIONS

B. Qian, Weikang. "A Reconfigurable Stochastic Architecture for Highly Reliable Computing." Researchgate.net, 2009, www.researchgate.net/publication/220904798_A_reconfigurable_stochastic_architecture_for_highly_reliable_computing. (Year: 2009).*

Alaghi, Armin. "The Logic of Random Pulses: Stochastic Computing." Researchgate.net, 2015, www.researchgate.net/publication/295418043_The_Logic_of_Random_Pulses_Stochastic_Computing. (Year: 2015).*

V. K. Chippa, S. Venkataramani, K. Roy and A. Raghunathan, "StoRM: A Stochastic Recognition and Mining processor," 2014 IEEE/ACM International Symposium on Low Power Electronics and Design (ISLPED), La Jolla, Ca, USA, 2014, pp. 39-44, doi: 10.1145/2627369.2627645. (Year: 2014).*

A. Alaghi, W. Qian and J. P. Hayes, "The Promise and Challenge of Stochastic Computing," in IEEE Transactions on Computer-Aided Design of Integrated Circuits and Systems, vol. 37, No. 8, pp. 1515-1531, Aug. 2018, doi: 10.1109/TCAD.2017.2778107. (Year: 2017).*

Gupta et al.. Revisiting Stochastic Computation: Approximate Estimation of Machine Learning Kernels, Position paper submitted to WACAS 2014, 2 pages 2014.

Nandakumar et al., Mixed-precision architecture based on computational memory for training deep neural networks, ISCAS 2018, 9 pages Dec. 4, 2017.

Poppelbaum et al., Stochastic computing elements and systems, Proceedings of the AFIPS Fall Joint Computer Conference 635-644 (1967).

Gokmen, et al., Acceleration of Deep Neural Network Training with Resistive Cross-Point Devices, Frontiers in Neuroscience, Jul. 21, 2016, 19 pages.

Callegari, et al., Embeddable ADC-based true random number generator for cryptographic applications using nonlinear signal processing and chaos, IEEE Trans. Signal Process. 53, 793 -805 (Feb. 2005).

* cited by examiner

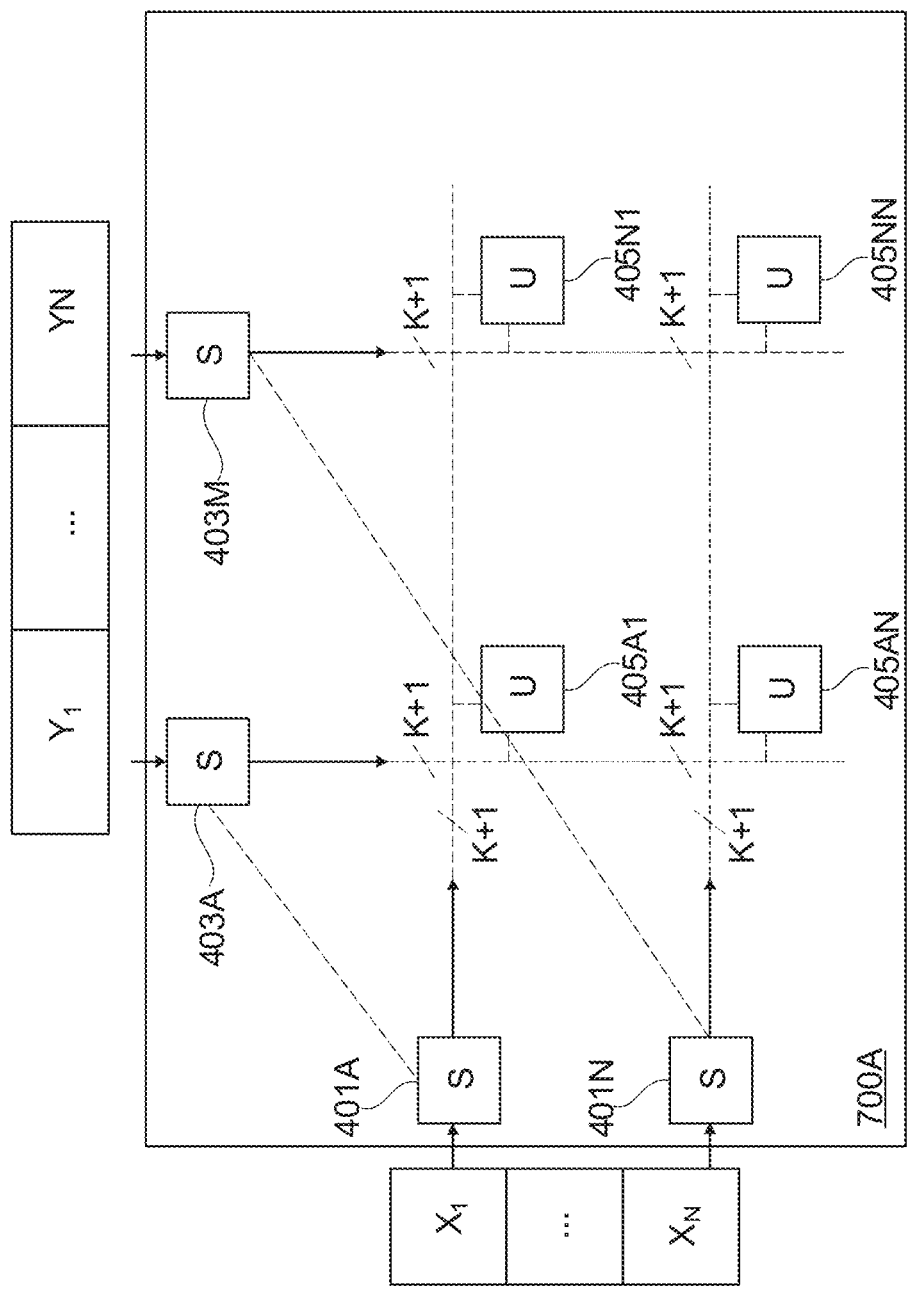

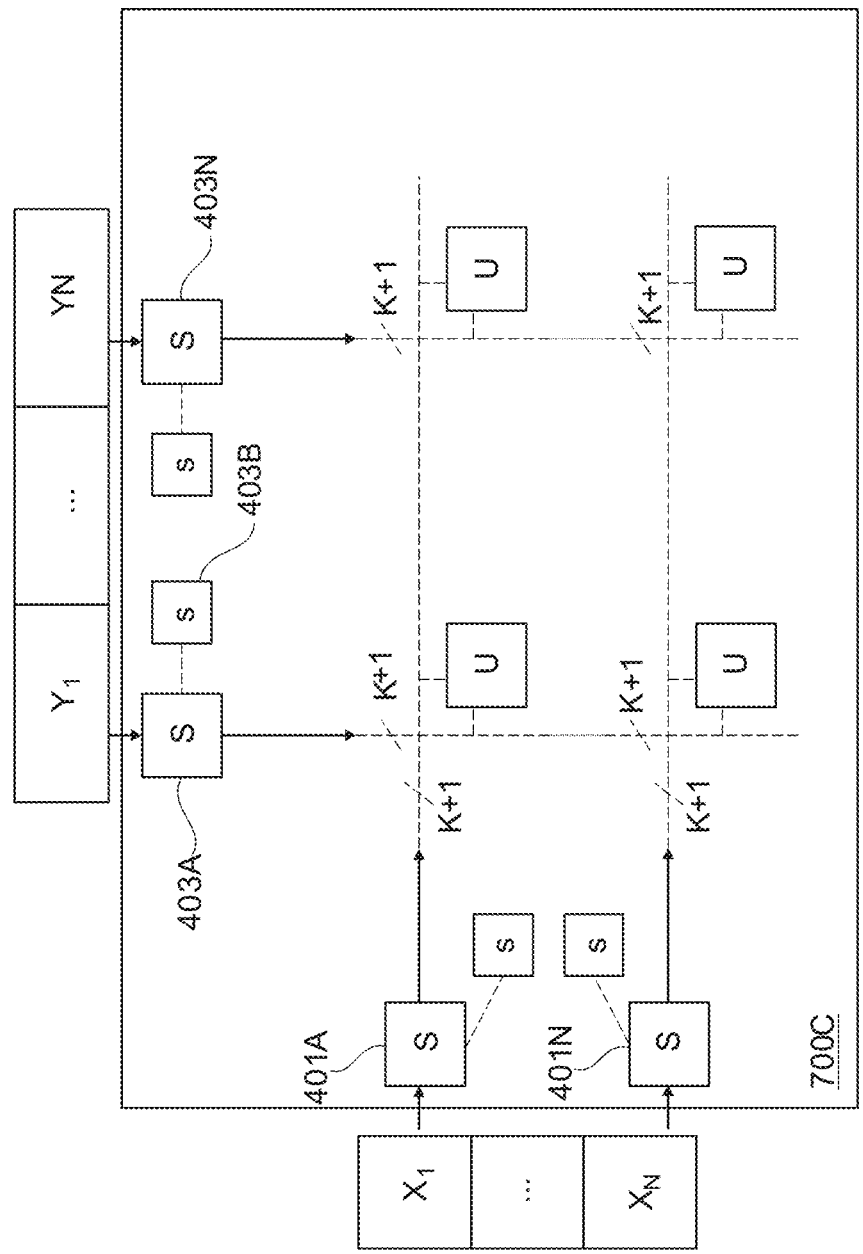

ELECTRONIC SYSTEM FOR COMPUTING ITEMS OF AN OUTER PRODUCT MATRIX

BACKGROUND

The present invention relates to the field of digital computer systems, and more specifically, to an electronic system for computing items of an outer product matrix.

Neural networks are a computational model used in artificial intelligence systems. Neural networks are based on multiple artificial neurons. Each artificial neuron is connected with one or more other neurons, and links can enhance or inhibit the activation state of adjoining neurons. However, training the neural networks such as Deep Neural Networks (DNNs) is an extremely computationally intensive task that requires massive computational resources and enormous training time that hinders their further application. Training the DNNs may for example involve outer product computations.

SUMMARY

Various embodiments provide an electronic system for computing items of an outer product matrix, method and use of the electronic system as described by the subject matter of the independent claims. Advantageous embodiments are described in the dependent claims. Embodiments of the present invention can be freely combined with each other if they are not mutually exclusive.

In one aspect, the invention relates to electronic system for computing items of an outer product matrix, for each item of at least part of the items of the matrix. The system is configured to:
  receive a pair of real numbers of two vectors, the pair corresponding to said item;
  compute a stochastic representation of the real numbers resulting in two sets of bits, the set of bits comprising a subset of bits representing the real number and a sign bit indicative of the sign of the real number; and
  perform a multiplication operation by a sequence of digital operations using the two sets of bits to provide a representation of said item, the digital operations comprising an AND operation and a data formatting operation for mapping the output of the AND operation to the representation of said item.

In another aspect, the invention relates to a method for computing items of an outer product matrix, for each item of at least part of the items of the matrix. The method comprises:
  receiving at an electronic system a pair of real numbers of two vectors, the pair corresponding to said item;
  computing by the electronic system a stochastic representation of the real numbers resulting in two sets of bits, the set of bits comprising a subset of bits representing the real number and a sign bit indicative of the sign of the real number; and
  performing by the electronic system a sequence of digital operations using the two sets of bits to provide a representation of said item, the digital operations comprising an AND operation and a data formatting operation for mapping the output of the AND operation to the representation of said item.

In another aspect, the invention relates to a stochastic multiplier unit for computing items of an outer product matrix, the stochastic multiplier unit being configured to receive two sets of bits being stochastic representation of two real numbers of an item of the matrix respectively and to perform a sequence of digital operations using the two sets of bits to provide a representation of said item, the digital operations comprising an AND operation and a data formatting operation for mapping the output of the AND operation to the representation of said item.

In another aspect, the invention relates to a use of the system of the above embodiment for computing items of an outer product required for synaptic updates of a deep neural network.

In another aspect, the invention relates to a computer program product comprising a computer-readable storage medium having computer-readable program code embodied therewith, the computer-readable program code configured to implement the steps of the method according to the previous embodiment.

BRIEF DESCRIPTION OF THE DRAWINGS

In the following embodiments of the invention are explained in greater detail, by way of example only, making reference to the drawings in which:

FIG. 7A depicts an electronic system with an example configuration of random number generators in accordance with the present subject matter.

FIG. 7C depicts an electronic system with an example configuration of random number generators in accordance with the present subject matter.

DETAILED DESCRIPTION

Figure 1A:
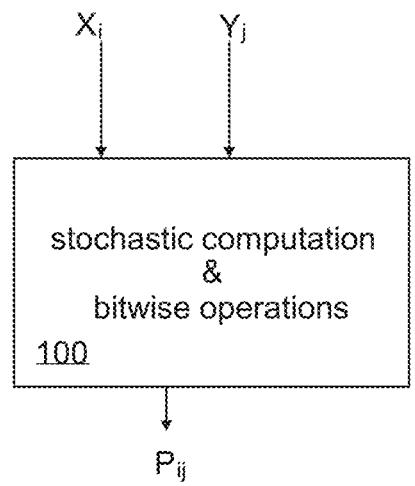
FIG. 1A depicts a diagram of an electronic system 100 in accordance with the present subject matter.

The descriptions of the various embodiments of the present invention will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Computation of an outer product of two vectors (e.g. vectors X and Y) is commonly used in a number of algorithms such as training of deep neural networks, image processing, etc. For example, in case of a deep neural network, vector Y may refer to activations and vector X may refer to gradients $\delta_j$. However, conventional electronic systems for the computation of outer products (e.g. floating point multipliers) may be very resource intensive. The present subject matter provides an outer product computation which may relax the demand for resources. For example, a real number that may be normalized in the range [0,1] may be represented as a sequence of independent Bernoulli bits of a desired length of sequence of bits. With such a representation, the multiplication of two real numbers may be obtained or approximated by the result of multiple digital operations involving for example a bitwise AND operation of two Bernoulli sequences corresponding to the two real numbers. This way, an expensive multiplication operation may be reduced down to ANDing of two binary sequences. One example implementation of such a stochastic multiplication may be using a desired bit length AND gate. For example, for the multiplication of real number a=0.3 by the real number b=0.4, the Bernoulli sequences 01101 and 10101 may be determined for a and b respectively, and the multiplication of c=a×b may be represented or approximated by the bitwise AND operation c=01101 AND 10101.

The present subject matter may further have the advantage of improving the accuracy of the multiplication operations involved in outer product computations. For example, in order to take into account the sign of the multiplied real numbers, a single ANDing operation (or AND operation) may not be sufficient or may even provide inaccurate results. The present subject matter performs multiple digital operations that operate on the whole sets of bits including their sign bits. For example, the multiple digital operations may comprise one or more data type conversion operations that follows an ANDing operation, wherein the data type conversion operations are used to format and/or convert an output of AND gate to a format and/or data type of the input real numbers.

The digital operations are performed such that the provided representation of the item is a value that has a format of the multiplied real numbers. For example, the data formatting operation comprises mapping the output of the AND operation to a respective value that has a format of the real numbers. The present subject matter may further be advantageous as it may provide a compact and resource saving implementation of the outer product computation. For example a single electronic unit may be used to provide the result of the multiplication that is further usable e.g. by other mathematical operations. This may prevent outputting only (meaningless) sequences of bits that need to be decoded offline before being used. This may prevent erroneous calculations that may result from a distributed processing of the multiplication. This may particularly be advantageous when processing millions of entries such as for deep neural network training.

According to one embodiment, the at least part of items comprises one of: a single item, a subset of items of the matrix and all items of the matrix.

The subset of items may be the items forming a row, column or diagonal of the matrix. For example, in case it is desired to compute all items of an outer product matrix of size N×N with O(1) complexity, the electronic system may comprise a crossbar of stochastic multiplier units having N rows and N columns. However, in case of limited resources, instead of having a crossbar of N rows (word lines) and N columns (bit lines) in total, only Z(≤N) rows with R(≤N) columns can be used to compute the outer product until the results for all the N×N numbers of the matrix are available. This may enable an electronic system that may compute a single item when Z=1 and R=1 e.g. using only one crosspoint for computation, and for the full outer product computation N×N times such computation may be performed. For example, in case of a single item, the system may be configured to consecutively receive the other pairs of real numbers that enable to compute all the N×N items of the outer product matrix. The time complexity in this case may be $O(N^2)$. If Z=1 and R=N e.g. using all columns but one row at a time, items of a row of the matrix may be determined at once (e.g. in parallel). In this case, N times such parallel computations may be performed, resulting in the time complexity of O(N).

This embodiment may enable a flexible implementation (e.g. depending on resources availability) of outer products computation using the present subject matter.

According to one embodiment, the system comprises for each item of the at least part of items two stochastic converters and a stochastic multiplier unit, wherein each of the stochastic converters is configured to perform the receiving of a respective real number of the pair of real numbers and the computation of the stochastic representation of the received real number wherein the stochastic multiplier unit is configured to receive the two sets of bits to perform the multiplication operation.

Each pair of real numbers may be input to respective two stochastic converters such that each of the two stochastic converters may be used to compute the stochastic representation of the real number it receives. If for example, processing N pairs of real numbers (Ri, Rj) in order to compute the respective N items of the matrix, may require N different pairs (Ci, Cj) of stochastic converters to be used for the respective N pairs (Ri, Rj), wherein two pairs of converters may share at most a same converter.

The stochastic converter may also be referred to as a converter. The converter may be configured to compute a stochastic (Bernoulli) representation of a real number. Such a stochastic representation may be a sequence of binary bits with a desired sequence length. The stochastic multiplier unit may be configured to compute a product of two real numbers using their stochastic (Bernoulli) representation. For example, two converters may be associated with the stochastic multiplier unit such that each of the two sets of bits received at the stochastic multiplier unit may be generated by the respective converter of the two converters. This embodiment may enable a modular and simplified implementation of the present subject matter.

According to one embodiment, the at least one item comprising a set of N items forming a row of the matrix, the system comprising a row of N serially connected stochastic multiplier units and a first set of N first stochastic converters and a second stochastic converter, wherein each stochastic multiplier unit of the set of stochastic multiplier units is configured to receive one of the received two sets of bits from a respective first stochastic converter of the first set and to receive the other set of bits from the second stochastic converter.

Having a single row for computation may be advantageous, as available memory technologies digital or analog may only support programming either a row or column or diagonal at a time. Also, row implementation in hardware may be more efficient in terms of circuit design.

According to one embodiment, the at least one item comprising N×M items forming the matrix, the system comprising a crossbar of N×M stochastic multiplier units and a first set of N first stochastic converters and a second set of M second stochastic converters, wherein each stochastic multiplier unit of the crossbar is configured to receive one of the received two sets of bits from a respective first stochastic converter of the first set and the other set of bits from a respective second stochastic converter of the second set.

For example, the crossbar may be an array of resistive processing units comprising: a plurality of rows of resistive processing units; and a plurality of columns of resistive processing units, wherein each resistive processing unit comprises a stochastic multiplier unit in accordance with the present subject matter. For example, a crossbar of stochastic multiplier units with two input K bit sequences may be used to compute multiplication of N numbers with other N numbers to obtain a N×N outer product matrix. The crossbar of such stochastic multiplier units may be used to compute (and store) the outer-product for two real valued vectors of arbitrary length in O(1) time complexity. The crossbar of the present subject matter may be advantageous as it may provide the outer product matrix in the format of the multiplied real numbers.

The subset of bits may be Bernoulli bits. In order to generate a single Bernoulli event or bit for a real number in the range [0,1], the real number may be compared with another uniformly sampled number from interval [0,1], and the output of that comparison is a Bernoulli bit. That is, if the desired number of Bernoulli bits to represent a real number is 10, 10 comparisons may be performed between that real number and different 10 generated random numbers. For generating a random number, a random number generator (RNG) may be used. For example, a pseudo random number generator may be used, wherein LFSR is an example of the pseudo random number generator. In another example, in order to generate truly random sequences, a true random generator (TRNG) may be used. The TRNG may be built out of devices naturally possessing a thermal noise that can reliably be sampled. In another example and for applications already using ADC, a last bit of the ADC can be used for generating one random bit per conversion, provided the input to the ADC has a noise with sufficient variance. The electronic system of the present subject matter may be provided with one or more random number generators e.g. as the ones described above.

According to one embodiment, the system comprises for each item of the at least part of items two stochastic converters. Each converter of the converters comprises a comparator being configured to: receive the real number, receive multiple random numbers from a random number generator of the converter; sample each of the random numbers in accordance with a predefined real number maximum size; compare each of the sampled random numbers with the received real number, resulting in the subset of bits representing the real number.

For example, the predefined real number maximum size may be the highest value that the received real number |X| can reach. In one example, real number maximum size may be user defined. This may enable a user controllable system. In another example, the real number maximum size may be the maximum number that can be encoded by the system being used. This may be advantageous as it may enable a systematic or automatic control of the present subject matter. For example, if the received real number is a L bits long number, L bits may be sampled down (e.g. from L+10 bits) from the random number, so that the real number and the sampled L bits of the random number may have a comparable range.

According to one embodiment, the system comprises for each item of the at least part of items two stochastic converters. Each converter of the converters comprises a normalization logic, comparator and a random number generator, the normalization logic being configured to receive the real number and to normalize the real number such that it lies in a predefined range, the comparator being configured to receive the normalized number from the normalization logic, receive multiple random numbers from the random number generator, and to compare the received normalized number with each received random number resulting in the subset of bits representing the real number.

According to one embodiment, the normalizing comprises dividing the real number by a predefined number and accommodating a sign change of the real number, wherein the predefined range is [0, 1]. Accommodating a sign change means taking into account the sign change.

According to one embodiment, the normalizing comprises dividing the real number by a predefined maximum number, wherein the predefined range is [−1, 1] wherein the comparator is configured to accommodate a sign change of the real number to compare two positive numbers.

According to one embodiment, the system comprises for each item of the at least part of items a stochastic multiplier unit for performing the sequence of digital operations, the stochastic multiplier unit comprising an AND logic configured to perform an AND operation between the two subsets of bits and format logic configured to perform a data type conversion operation on the result of the AND operation. According to one embodiment, the system comprises for each item of the at least part of items a stochastic multiplier unit for performing the sequence of digital operations, the stochastic multiplier unit comprising an XOR gate to perform an XOR operation between the sign bits of the sets of bits, an AND logic configured to perform an AND operation between the two subsets of bits, a counter being configured to count the number of ones in the result of the AND operation, a multiplication circuit to multiply the count of ones by a predefined scale factor associated with the output of the XOR operation, the scale factor enabling to map or convert the counter output to a value having a format of the multiplied real numbers. The sequence of digital operations may comprise one or more successive and/or one or more parallel operations. The sequence of digital operations may comprise the XOR operation, the AND operation, the counting and the multiplication by the scale factor. The XOR operation may for example be performed after the AND operation.

According to one embodiment, the system comprises for each item of the at least part of items a stochastic multiplier unit for performing the sequence of digital operations, the stochastic multiplier unit comprising an XOR gate to perform an XOR operation between the sign bits of the sets of bits, an AND logic configured to perform an AND operation between the two subsets bits, a count circuitry being configured to count the number of ones in the result of the AND operation in positive or negative direction depending on the output of the XOR operation, a multiplication circuit to multiply the count of ones by a predefined scale factor. The scale factor enables to map or convert the counter output to a value having a format of the multiplied real numbers. The sequence of digital operations may comprise the XOR operation, the AND operation, the counting and the multiplication by the scale factor.

The scale factor may be determined using the pairs of real numbers that are to be multiplied. For example, the scale factor $F_{scale}$ may be defined as follows. $F_{scale}=(X_{max} \times Y_{max})/K$, where $X_{max}$ and $Y_{max}$ are the maximum values of the real numbers of two vectors X and Y to be multiplied in accordance with outer product and K is the length of the subset of bits. This scale factor may be advantageous as it may be used for computing all items of the outer product matrix of vectors X and Y. In another example, $Fscale=2^{(Floor(log\ 2(Xmax))+Floor(log\ 2(Ymax))-Floor(log\ 2(K)))}$ where the floor of an element denotes rounding that element to the nearest integer less than or equal to that element. This may enable a faster and resource inexpensive computation while still having a comparable value of $(X_{max} \times Y_{max})/K$.

According to one embodiment, the system comprises for each item of the at least part of items a stochastic multiplier unit for performing the sequence of digital operations, the stochastic multiplier unit comprising an XOR gate to perform an XOR operation between the sign bits of the sets of bits, an AND logic configured to perform an AND operation between the two subsets of bits, a count circuitry being configured to count the number of ones in the result of the AND operation in positive or negative direction depending on the output of the XOR operation, a shift register to shift the count of ones by the 2th power in a predefined scale factor or to shift the scale factor by the 2th power in the count of ones. The shift of the count of ones may be a right shift and may be referred to as counter_output>>Fscale. The shift of the Fscale may be a left shift and may be referred to as: Fscale<<Floor(log 2(counter_output)) where the floor of an element denotes rounding that element to the nearest integer less than or equal to that element. The sequence of digital operations may comprise the XOR operation, the AND operation, the counting and the multiplication by the scale factor.

According to one embodiment, the system comprises for each item of the at least part of items a stochastic multiplier unit for performing the sequence of digital operations, the stochastic multiplier unit comprising an XOR gate to perform an XOR operation between the sign bits of the sets of bits, an AND logic configured to perform an AND operation between the two subsets of bits, a count circuitry being configured to count the number of ones in the result of the AND operation, a multiplication circuit to multiply the count of ones by a predefined scale factor, and a sign converter to convert the sign of the multiplication circuit's output based on a sign of the final product.

According to one embodiment, the system comprises for each item of the at least part of items a stochastic multiplier unit for performing the sequence of digital operations, the stochastic multiplier unit comprising an XOR gate to perform an XOR operation between the sign bits of the sets of bits, an AND logic configured to perform an AND operation between the two subsets of bits, a count circuitry being configured to count the number of ones in the result of the AND operation, a shift register to shift the count of ones by the 2th power in a scale factor or to shift the scale factor by the 2th power in the count and a sign converter to convert the sign of shift register output based on sign of final product.

According to one embodiment, each stochastic converter of the first and second sets of stochastic converters comprises a random number generator, the stochastic converter being configured to compute the stochastic representation by comparing the real number it receives with multiple random numbers generated by the random number generator, thereby generating the set of bits. For example, for a matrix of N×N items this embodiment may use 2N random number generators. Each converter may compute the stochastic representation using random numbers generated by its own random number generator. This embodiment may be advantageous as it may enable to perform computations in O(1) complexity.

According to one embodiment, wherein N first converters of the first sets comprise respective random number generators, wherein each first converter of the first set is configured to compute the stochastic representation by comparing the real number it receives with multiple random numbers generated by its random number generator, thereby generating the set of bits, wherein each second converter of the second set is configured to compute the stochastic representation by comparing the real number it receives with the multiple random numbers generated by the random number generator of a corresponding first converter, thereby generating the set of bits. Using 2N random number generators may contribute to significant energy and area requirements for some applications. This embodiment provides a scheme with fewer random number generators that can be reused for computations. Thus, demands for 2N random number generators can be reduced, by just using N random number generators. For example, the N random number generators may first be used to compute Bernoulli sequences for N elements e.g. along the bit lines. Then previously computed random numbers from the N random number generators may be reused to compute Bernoulli sequences for remaining N elements. The processing of this embodiment may be parallelized by sharing output of these random number generators across word and bit lines.

According to one embodiment, the crossbar comprises row lines and column lines, wherein each row line is connected to a respective second converter of the second set, and each column line is connected to a respective first converter of the first set. The row lines comprise one or more subsets of row lines. The column lines comprise one or more subsets of column lines. Only one first converter of the first converters that are connected to a subset of column lines comprises a random number generator and/or only one second converter of the second converters that are connected to a subset of row lines comprises a random number generator (that is the crossbar may comprise at least one single random number generator that can be used by all the converters of the crossbar for performing the comparison of the real number). Each first converter of the first set is configured to compute the stochastic representation by comparing the real number it receives with multiple random numbers generated by its random number generator or by the random number generator of another first converter of the subset of column lines to which the first converter is connected or by the random number generator of another converter of the second set (in other terms, if the first converter comprises a random number generator it uses that random number generator otherwise it uses another random number generator of another converter as described herein), thereby generating the set of bits, wherein each second converter of the second set is configured to compute the stochastic representation by comparing the real number it receives with multiple random numbers generated by its random number generator or by the random number generator another second converter of the subset of row lines to which the first converter is connected or by the random number generator of another converter of the first set, thereby generating the set of bits. The row lines comprise one single subset of row lines means that the one single subset of rows comprises all rows of the crossbar. The column lines comprise one single subset of column lines means that the one single subset of columns comprises all columns of the crossbar.

In one example, one stochastic converter of the first set comprises a random number generator, wherein each stochastic converter of the first set is configured to compute the stochastic representation by comparing the real number it receives with multiple random numbers generated by the random number generator, thereby generating the set of bits, wherein each stochastic converter of the second set is configured to compute the stochastic representation by comparing the real number it receives with the multiple random numbers generated by the random number generator, thereby generating the set of bits. This example enables that only one random number generator is present and used by all stochastic converters of the first and second set.

In one example, one stochastic converter of the second set comprises a random number generator, wherein each stochastic converter of the second set is configured to compute the stochastic representation by comparing the real number it receives with multiple random numbers generated by the random number generator, thereby generating the set of bits, wherein each stochastic converter of the first set is configured to compute the stochastic representation by comparing the real number it receives with the multiple random numbers generated by the random number generator, thereby generating the set of bits. This example enables that only one random number generator is present and used by all stochastic converters of the first and second set.

Reusing same N (e.g. for a matrix of size N×N) random number generators across bit lines and word lines may cause loss of independence and hence errors in computations may occur for some applications. This problem may be addressed by this embodiment by using N/c (e.g. c=2, and N/c is the subset of row lines) random number generators across row lines and other N/c (N/c is the subset of column lines) random number generators across column lines and sharing each random number between two consecutive row lines (or column lines).

According to one embodiment, a converter of the first set and another converter of and second set comprise a first and second random number generator respectively, wherein each first converter of the first set is configured to compute the stochastic representation by comparing the real number it receives with multiple random numbers generated by the first random number generator, thereby generating the set of bits, wherein each converter of the second set is configured to compute the stochastic representation by comparing the real number it receives with multiple random numbers generated by the second random number generator, thereby generating the set of bits. Instead of using multiple random number generators, full outer product can be performed using only 1 random number generator in accordance with this embodiment. This can be done by using a single random number generator and sharing it across all word and bit lines. One stochastic converter generates K random values and those are shared across all stochastic converters of the crossbar. This embodiment may reduce area and energy demands of hardware significantly compared to schemes with 2N or N random number generators.

According to one embodiment, the set of bits is of a predefined length. For example, the set of bits has a length of K+1 bits, where K is the number of Bernoulli bits. The value of K may for example be user pre-defined.

According to one embodiment, in case the at least part of items is smaller than all items, the system is further configured to further receive reals numbers to compute the remaining items of the matrix. For example, in case the electronic system is configured to compute a single item of the matrix (N×N) only, the system may further be configured to consecutively receive N×N−1 pairs of real numbers that correspond to the remaining items of the matrix.

Figure 1B:
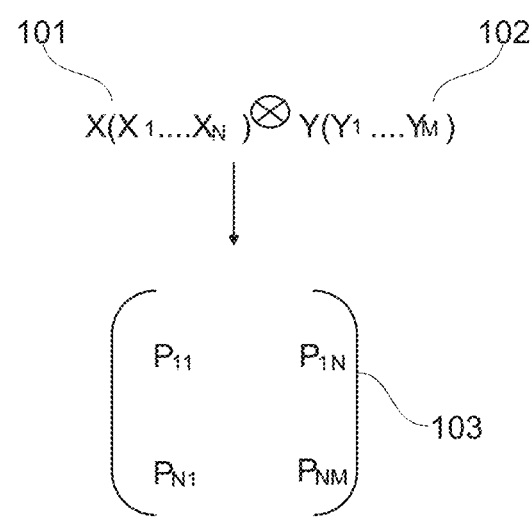
FIG. 1B depicts an outer product matrix.

FIG. 1A depicts a diagram of an electronic system 100 in accordance with the present subject matter. The electronic system 100 comprises a logic circuitry that is configured to compute items of an outer product matrix. As shown in FIG. 1B, the outer product matrix P 103 may for example comprise N×M items. For example, two vectors X 101 and Y 102 of real numbers of sizes N and M respectively may be provided as input to the electronic system 100. Each item $P_{ij}$ of the outer product matrix 103 may be obtained by multiplying a respective pair of real numbers $X_i x Y_j$ of the two vectors 101 and 102. The real numbers may for example be in the range of [0, 1]. For each item $P_{ij}$ of the matrix 103, the electronic system 100 may be configured to receive the pair of reals numbers $X_i$ and $Y_j$ that should be multiplied in order to obtain that item $P_{ij}$.

For example, upon receiving the pair of real numbers $X_i$ and $Y_j$, the electronic system 100 may be configured to convert the two received numbers $X_i$ and $Y_j$ into stochastic numbers. The electronic system 100 may compute a stochastic representation of the real numbers $X_i$ and $Y_j$ which may result in two sets of bits representing $X_i$ and $Y_j$. The set of bits of each real number $X_i$ or $Y_j$ comprises a subset of bits representing the real number and a sign bit indicative of the sign of the real number i.e. the subset of bits are all bits of the set of bits excluding the single sign bit. The length of the subset of bits may for example be a predefined length.

For example, a real number in the range [0, 1] may be represented as a sequence of independent Bernoulli events of a desired length of sequence of events. To generate a single Bernoulli event for a real number in [0,1], the real number may for example be compared with a uniformly sampled number from interval [0,1], and the output of the comparison is a Bernoulli event. The real number may further be compared with further random numbers in [0, 1] until obtaining a number of events or bits that correspond to the desired length e.g. if the predefined length is 10, the real number may be compared with 10 generated random numbers resulting in 10 bits plus the sign bit.

With such a representation, multiplication of two numbers may use multiple digital operations. The digital operations may for example comprise a bitwise AND operation of two Bernoulli sequences corresponding to two numbers. The electronic system 100 may then perform a multiplication operation by performing a sequence of digital operations using the two sets of bits to provide a representation of said item $P_{ij}$.

The result of the sequence of digital operations may be an accurate representation of the item $P_{ij}$. That result may be provided as an output of the electronic system 100. In one example, the result may be stored and further items of the outer product matrix P may be computed by the electronic system 100 as described herein.

Figure 2:
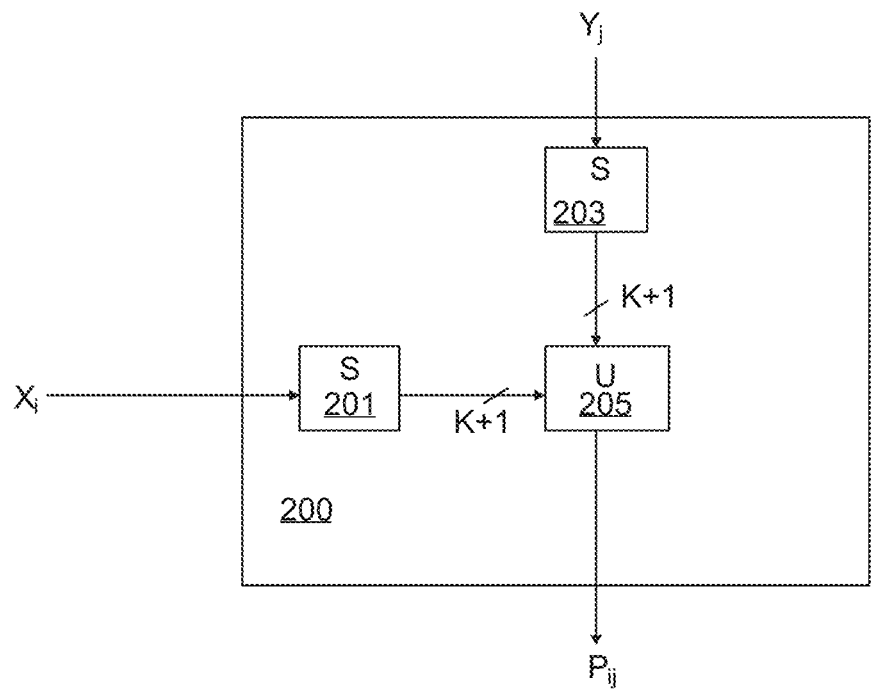
FIG. 2 depicts a diagram of an example electronic system in accordance with the present subject matter.

FIG. 2 depicts a diagram of an example electronic system 200 in accordance with the present subject matter.

The electronic system 200 comprises two converters 201 and 203 and a stochastic multiplier unit 205. For computing an item $P_{ij}$ of the matrix 103, the electronic system 200 may receive a pair of the two corresponding real numbers $X_i$ and $Y_j$ of the vectors 101 and 102 respectively. In the example of FIG. 2, each of the two converters 201 and 203 is configured to receive a respective real number of the pair $(X_i, Y_j)$. As shown in FIG. 2, the converter 201 receives the real number $X_i$ and converter 203 receives the real number $Y_j$. Each of the two converters is configured to generate a stochastic number representing the received real number (or to compute a stochastic representation of the real number). The resulting set of K+1 bits are then given as input to the stochastic multiplier unit 205. The K bits are Bernoulli bits representing the real number and the 1 bit is a sign bit indicative of the sign of the real number.

As shown in FIG. 2, the stochastic multiplier unit 205 is configured to receive the two sets of bits associated with the real numbers $X_i$ and $Y_j$ from the two converters 201 and 203 respectively. The stochastic multiplier unit 205 may be configured to perform a sequence of digital operations that enable the multiplication of the received real numbers $X_i$ and $Y_j$. The sequence of digital operations may for example include a bitwise operation e.g. an AND operation and at least one additional bit operation that takes into account the sign of the product of $X_i$ and $Y_j$. The sequence of digital operations may be performed between the two K bits as well as between the sign bits in order to compute the multiplication of $X_i$ and $Y_j$. Other examples of the multiplication operation may be performed described herein. The result of the multiplication operation on the received sets of bits may be provided by the stochastic multiplier unit 205.

Figure 3:
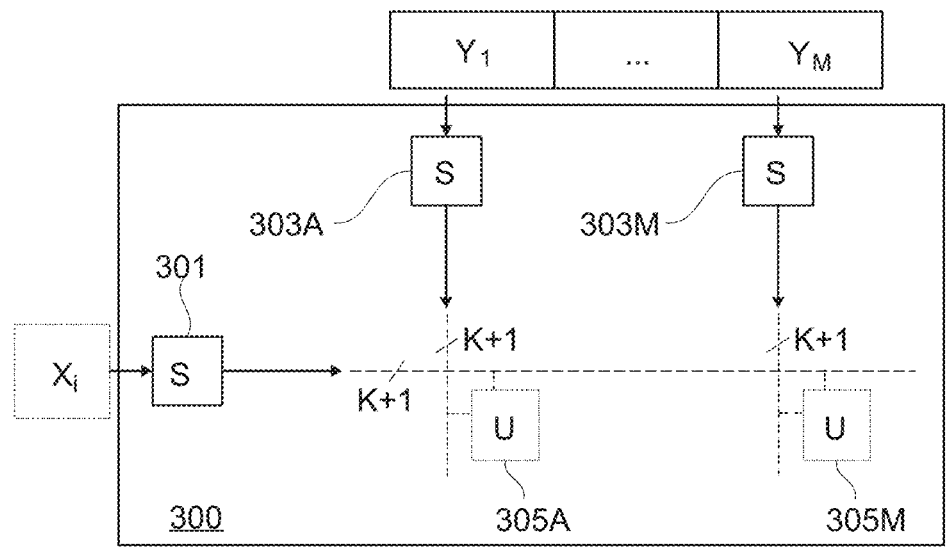
FIG. 3 depicts a diagram of an example electronic system in accordance with the present subject matter.

FIG. 3 depicts a diagram of an example electronic system 300 in accordance with the present subject matter.

The electronic system 300 may be configured to compute the items $P_{i1}$, $P_{i2}$ . . . and $P_{iM}$ of a complete row i of the outer product matrix 103 e.g. if i=1 the first row of items of the matrix 103 may be computed using the electronic system 300.

For computing the items $P_{i1}$, $P_{i2}$ . . . and $P_{iM}$, the electronic system 300 may be configured to receive the respective M pairs of real numbers $(X_i, Y_1), (X_i, Y_2) \ldots$ and $(X_i, Y_M)$ and to perform the sequence of digital operations on each of the M pairs. For that, the electronic system 300 comprises a first set of first converters 303A-303M and a second converter 301. Each first converter of the first set of converters 303A-303M is configured to receive a respective real number $Y_j$ of the vector 102 e.g. first converter 303A may be configured to receive the real number $Y_1$, and the first converter 303M may be configured to receive the real number $Y_M$. And the second converter 301 may be configured to receive the real number that is shared between the pairs, namely $X_i$.

The electronic system 300 may further comprise a set or a row of M serially connected stochastic multiplier units 305A-305M.

Each of the converters 301 and 303A to 303M may be a stochastic converter that computes a stochastic (Bernoulli) representation of a real number value that it receives. Such a stochastic representation is a sequence of binary bits with a desired sequence length. Each of the converters 301 and 303A to 303M may be configured to generate a stochastic number representing the received real number. The resulting set of K+1 bits are then given as input to the respective stochastic multiplier unit 305A-M. The K bits are Bernoulli bits representing the real number and the 1 bit is a sign bit indicative of the sign of the real number. Each of the stochastic multiplier units 305A-M is configured to receive a set of K+1 bits from the respective converter 303A-M. In addition, each of the stochastic multiplier units 305A-M is configured to receive a same set of K+1 bits from the second converter 301. This may enable that each of the stochastic multiplier units 305A to 305M computes product of two real numbers $(X_i, Y_1)$, $(X_i, Y_2)$ . . . and $(X_i, Y_M)$ respectively using their stochastic (Bernoulli) representation.

The electronic system of FIG. 3 may provide a row of stochastic multiplier units that can be used to compute (and store) outer-product, in O(N) time complexity, for two real valued vectors of arbitrary length. Motivation for having a single row for computation is that, available memory technologies digital or analog may only support programming either a row or column or diagonal at a time. Also, in hardware implementations, a row implementation may be advantageous in terms of circuit design.

Figure 4:
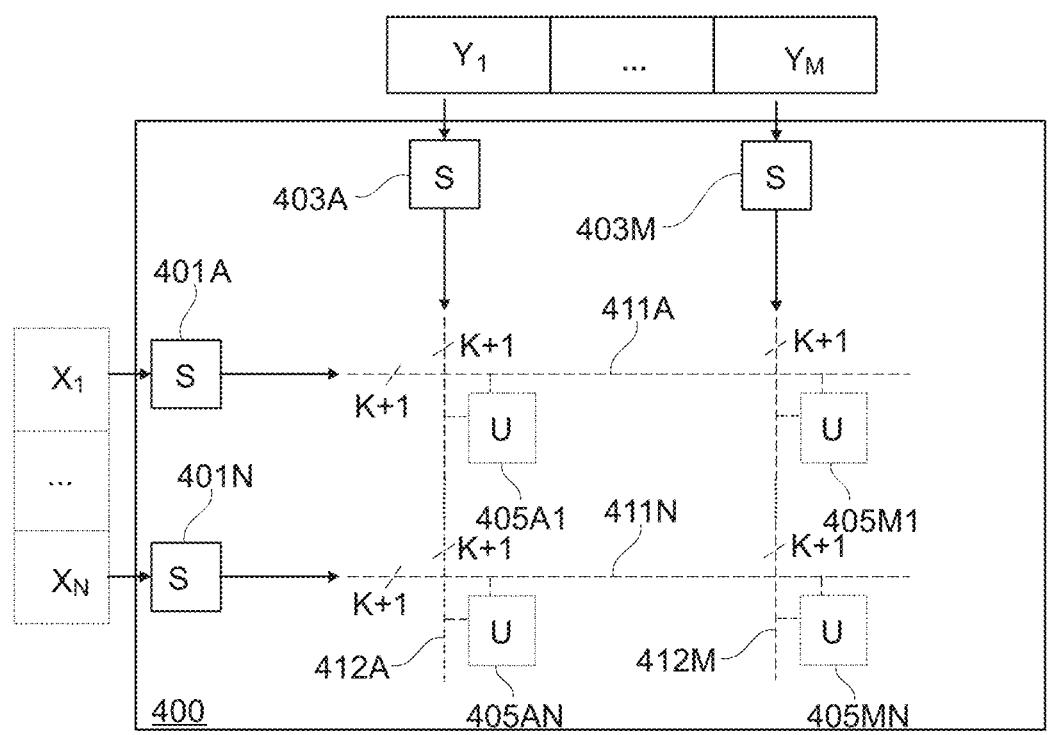
FIG. 4 depicts a diagram of an example electronic system in accordance with the present subject matter.

FIG. 4 depicts a diagram of an example electronic system 400 in accordance with the present subject matter. The electronic system 400 may be configured to compute all the items $P_{ij}$ of the outer product matrix 103.

For computing all items $P_{ij}$ of the matrix 103, the electronic system 400 may be configured to receive the respective N×M pairs of real numbers $(X_i, Y_j)$, where i=1 . . . N, and j=1 . . . M, and to perform the sequence of digital operations on each of the N×M pairs. For that, the electronic system 400 comprises a first set of first converters 403A-303M and a second set of second converters 401A-401N. Each first converter of the first set of converters 403A-403M is configured to receive a respective real number $Y_j$ of the vector 102 e.g. first converter 403A may be configured to receive the real number $Y_1$, and the first converter 303M may be configured to receive the real number $Y_M$. Each second converter of the second set of converters 401A-403N is configured to receive a respective real number $X_i$ of the vector 101 e.g. second converter 401A may be configured to receive the real number $X_1$, and the second converter 401N may be configured to receive the real number $X_N$.

The electronic system 400 may further comprise a crossbar of N×M stochastic multiplier units 405A1, 405A2 . . . 405MN. Crossbar of such stochastic multiplier units may be used to compute (and store) outer-product, in O(1) time complexity, for two real valued vectors of arbitrary length. The crossbar may comprise row lines (or word lines)

411A-N and column lines (or bit lines) 412A-M. Each row line comprises respective serially connected stochastic multiplier units e.g. the row line 411A comprises serially connected stochastic multiplier units 405A1-405M1. Each column line comprises respective serially connected stochastic multiplier units e.g. the column line 412M comprises serially connected stochastic multiplier units 405M1-405MN.

Each of the converters 401A to 401N and 403A to 403M may be a stochastic converter that computes stochastic (Bernoulli) representation of a real number value that it receives. Such a stochastic representation is a sequence of binary bits with a desired sequence length. Each of the converters 401 to 401N and 403A to 403M may be configured to generate a stochastic number representing the received real number. The resulting set of K+1 bits are then given as input to the respective stochastic multiplier unit. The K bits are Bernoulli bits representing the real number and the 1 bit is a sign bit indicative of the sign of the real number.

Each of the N×M stochastic multiplier units 405A1 to 405MN is configured to receive a set of K+1 bits from the respective first converter 403A-M and another set of K+1 bits from a respective second converter 401A-N. For example, the column of stochastic multiplier units 405A1 to 405AN may be configured to receive a same set of K+1 bits from the respective first converter 403A. For example, the row of stochastic multiplier units 405AN to 405MN may be configured to receive a same set of K+1 bits from the respective second converter 401N. This system may enable that each of the N×M stochastic multiplier units computes product of respective two real numbers $(X_i, Y_j)$ using their stochastic (Bernoulli) representation.

Figure 5A:
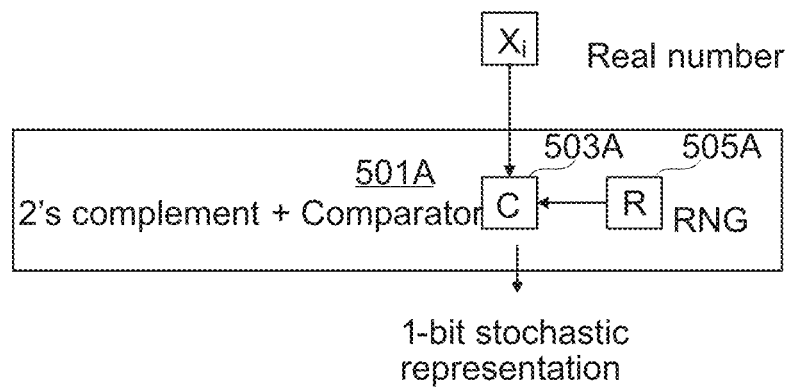
FIG. 5A depicts a diagram of an example converter in accordance with the present subject matter.

FIG. 5A depicts a diagram of an example converter 501A in accordance with the present subject matter.

The converter 501A comprises a comparator 503A and a random number generator 505A. The comparator 503A is configured to receive a real number $X_i$ and to receive a random number from the random number generator 505A. The received real number $X_i$ and the random number may then be compared by the comparator, wherein the result of the comparison is a single bit which may be referred to as 1-bit stochastic representation. Multiple comparisons, by the comparator, of $X_i$ with independent sampled uniform random numbers from the random number generator 505A, generate a sequence of binary bits in the form of stochastic representation of the real number $X_i$.

The converter 501A may be a stochastic converter that converts a real number to its stochastic (Bernoulli) representation. If for example, the received real number $X_i$ takes values from a known range $[-X_{max}, X_{max}]$ and the random number generator 505A generates a number which is sufficiently long (32 bits or 64 bits), the generated random number may be down-sampled based on the size of $X_{max}$ in order to be compared with $X_i$. For example, if $X_{max}$ is 8-bit long number in digital, then only 8-bits may be sampled from the generated random number. Thus, $X_i$ and the sampled generated random number may have values in comparable range.

Figure 5B:
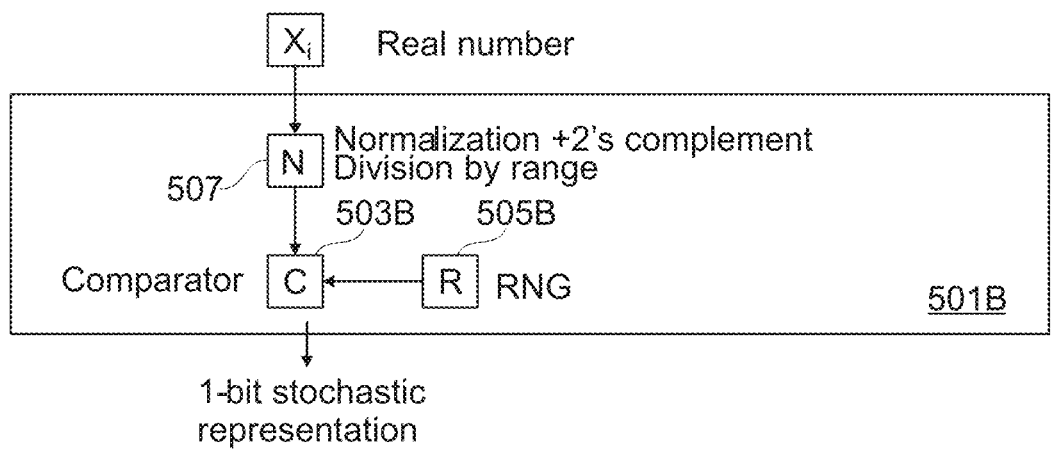
FIG. 5B depicts a diagram of an example converter in accordance with the present subject matter.

FIG. 5B depicts a diagram of an example converter 501B in accordance with the present subject matter. The converter 501B comprises a comparator 503B and a random number generator 505B. In addition, the converter 501B comprises normalization logic 507.

The normalization logic 507 is configured to receive a real number $X_i$ and to normalize the real number $X_i$ such that it lies in a predefined range. For example, in order to compute a stochastic representation of the real number $X_i$, it is first normalized by dividing it by a desired maximum possible range. This may scale the real number to the [−1,1] range. Additionally, the sign change can be taken into account or used in order to scale the real number to the [0,1] range.

The comparator 503B is configured to receive the normalized number from the normalization logic 507 and to receive a random number from the random number generator 505B. The received normalized number and the random number may then be compared by the comparator, wherein the result of the comparison is a single bit which may be referred to as 1-bit stochastic representation. Multiple comparisons of the normalized number $X_i$ with independent sampled uniform random numbers from the random number generator 505B, generate a sequence of binary bits in the form of a stochastic representation of the real number $X_i$.

Figure 5C:
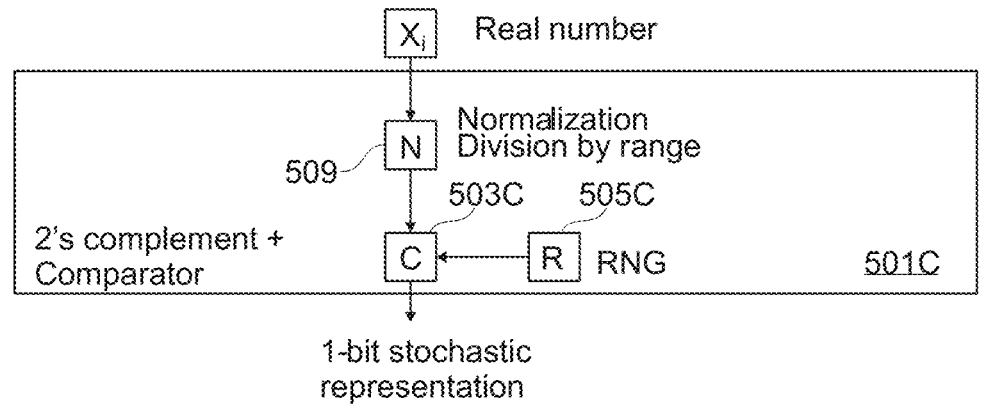
FIG. 5C depicts a diagram of an example converter in accordance with the present subject matter.

FIG. 5C depicts a diagram of an example converter 501C in accordance with the present subject matter. The converter 501C comprises a comparator 503C and a random number generator 505C. In addition, the converter 501C comprises normalization logic 509.

The normalization logic 507 is configured to receive a real number $X_i$ and to normalize the real number $X_i$ such that it lies in a predefined range. For example, in order to compute stochastic representation of the real number $X_i$, it is first normalized by dividing it by a desired maximum possible range. This may scale the real number to the [−1,1] range.

The comparator 503C is configured to receive the normalized number from the normalization logic 509 and to receive a random number from the random number generator 505C. The received normalized number and the random number may then be compared by the comparator, wherein the result of the comparison is a single bit which may be referred to as 1-bit stochastic representation. Additionally the sign change of the normalized real number $X_i$ may be accommodated at the comparator 503C in order to be able to compare two positive numbers. Multiple comparisons of the normalized number $X_i$ with independent sampled uniform random numbers from the random number generator 505C, generate a sequence of binary bits in the form of stochastic representation of the real number $X_i$.

FIGS. 6A-F provide example systems for executing different sequences of digital operations. For example, elements of FIG. 6A-E other than the AND gate may enable to perform the data type conversion operations.

Figure 6A:
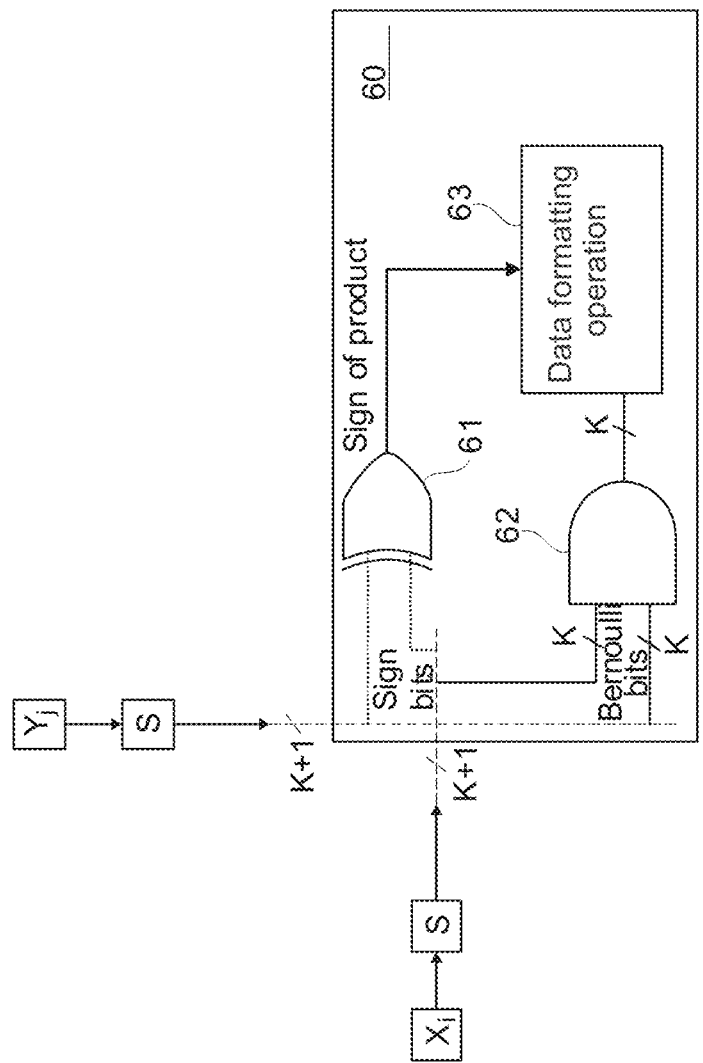
FIG. 6A depicts a diagram of an example stochastic multiplier unit in accordance with the present subject matter.

FIG. 6A depicts a diagram of an example stochastic multiplier unit 60 in accordance with the present subject matter.

The stochastic multiplier unit 60 is configured to receive two sets of K+1 bits representing the real number $X_i$ and $Y_j$ respectively. The sets of bits may be produced as described herein by a converter in accordance with the present disclosure. The sets of bits may be stochastic representations of respective real numbers.

The stochastic multiplier unit 60 comprises an XOR gate 61. The XOR gate 61 is configured to receive the sign bits of the real number $X_i$ and $Y_j$ respectively and to perform an XOR operation between the sign bits in order to provide an output indicative of a sign of the product of the two real numbers $X_i$ and $Y_j$.

The stochastic multiplier unit 60 further comprises an AND gate 62. The AND gate 62 is configured to receive the two subsets of K bits representing the two real numbers $X_i$ and $Y_j$ and to perform an AND operation between the two subsets of K bits. The result or output of the AND operation are K bits are provided as input to a data formatting unit 63 of the stochastic multiplier unit 60. In addition, the sign of the product that results from the XOR operation is provided as input to the data formatting unit 63 of the stochastic multiplier unit 60. The data formatting unit 63 is further configured to perform a data formatting operation. The data formatting operation may transform the output of the AND gate into a value that has format of the multiplied real numbers $X_i$ and $Y_j$. Examples implementations of the data formatting unit are described with reference to FIGS. 6B-F.

Figure 6B:
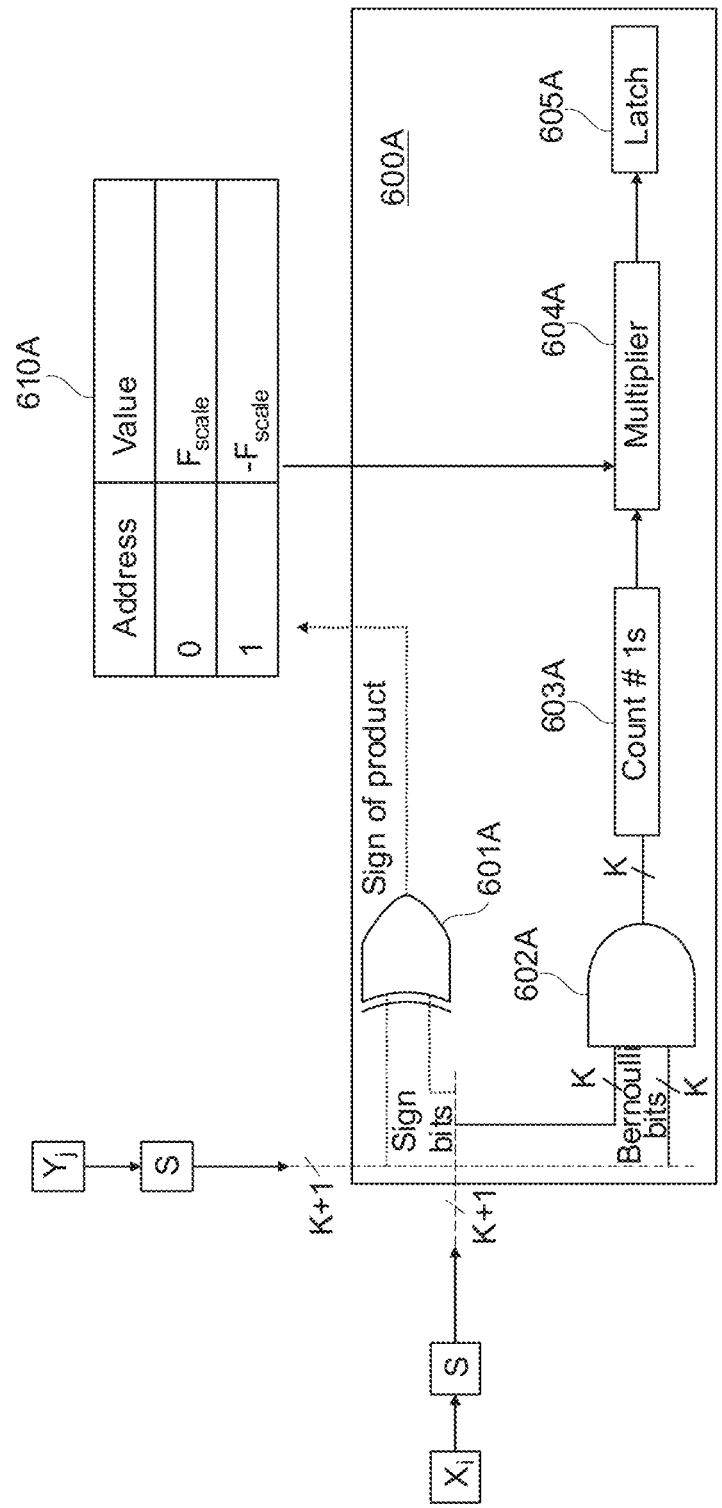
FIG. 6B depicts a diagram of an example stochastic multiplier unit in accordance with the present subject matter.

FIG. 6B depicts a diagram of an example stochastic multiplier unit 600A in accordance with the present subject matter.

The stochastic multiplier unit 600A is configured to receive two sets of K+1 bits representing the real number $X_i$ and $Y_j$ respectively. The sets of bits may be produced as described herein by a converter in accordance with the present disclosure. The sets of bits may be stochastic representations of respective real numbers.

The stochastic multiplier unit 600A comprises an XOR gate 601A. The XOR gate 601A is configured to receive the sign bits of the real number $X_i$ and $Y_j$ respectively and to perform an XOR operation between the sign bits in order to provide an output indicative of a sign of the product of the two real numbers $X_i$ and $Y_j$. The sign of the product that results from the XOR operation is then provided as input to a look-up table 610A, that associates addresses to corresponding scale factors. As shown in FIG. 6B, an address 0 is associated with a value Fscale and address 1 is associated with value −Fscale. Using the look-up table 610A a +/−Fscale value may be chosen based on a sign of the final product (output of the XOR gate).

The stochastic multiplier unit 600A further comprises an AND gate 602A. The AND gate is configured to receive the two subsets of K bits representing the two real numbers $X_i$ and $Y_j$ and to perform an AND operation between the two subsets of K bits. The result or output of the AND operation are K bits which are provided as input to a counter 603A of the stochastic multiplier unit 600A. The counter 603A is configured to count the number of ones in the result of the AND operation. The resulting count of ones may be provided as input to a multiplication circuit 604A of the stochastic multiplier unit 600A. The multiplication circuit 604A is further configured to receive the +/−Fscale value of the look-up table 610A that corresponds to the result of the XOR operation between the sign bits. The multiplication circuit 604A is further configured to multiply the count of ones by the scale factor to get a final product and to store the result (final product) of the multiplication in a latch 605A of the stochastic multiplier unit 600A.

Figure 6C:
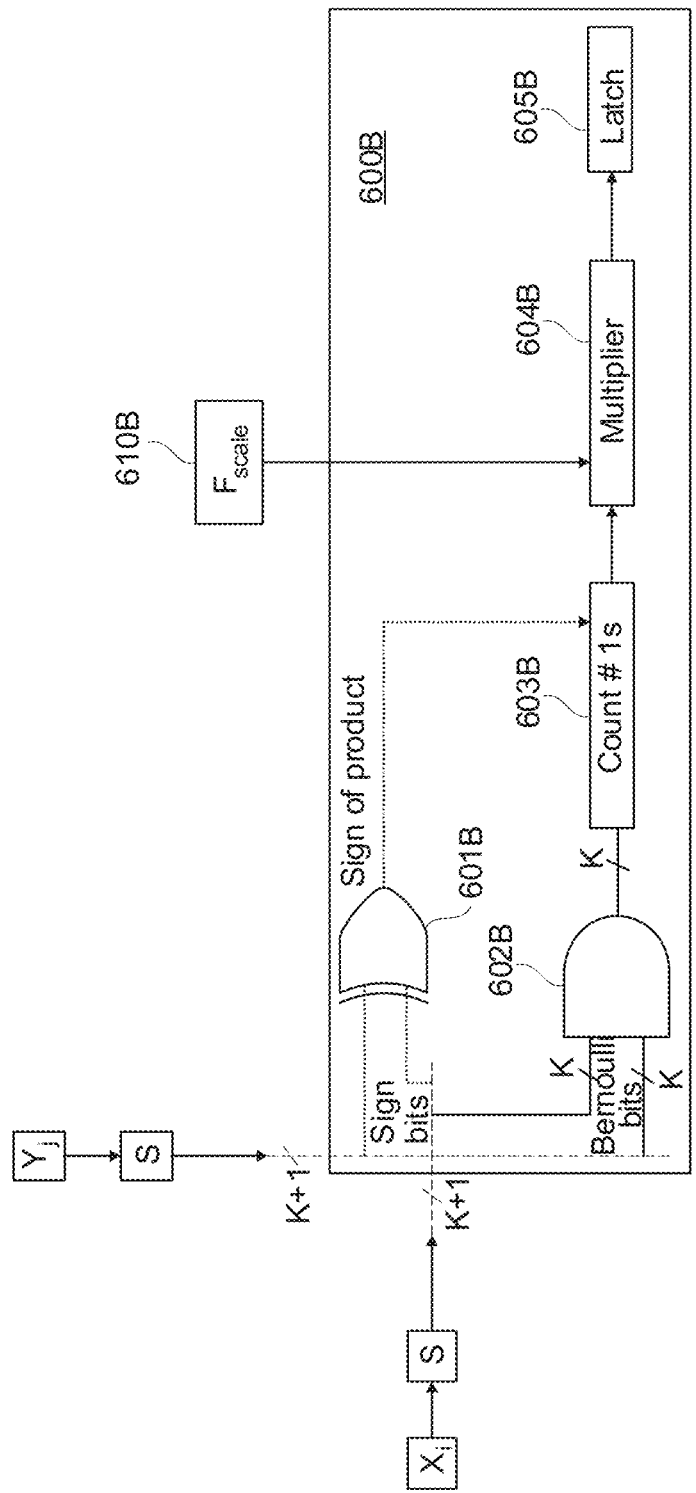
FIG. 6C depicts a diagram of an example stochastic multiplier unit in accordance with the present subject matter.

FIG. 6C depicts a diagram of an example stochastic multiplier unit 600B in accordance with the present subject matter.

The stochastic multiplier unit 600B is configured to receive two sets of K+1 bits representing the real number Xi and Yj respectively. The sets of bits may be produced as described herein by a converter in accordance with the present disclosure. The sets of bits may be stochastic representations of respective real numbers.

The stochastic multiplier unit 600B comprises an XOR gate 601B. The XOR gate 601B is configured to receive the sign bits of the real number Xi and Yj respectively and to perform an XOR operation between the sign bits in order to provide an output indicative of a sign of the product of the two real numbers $X_i$ and $Y_j$.

The stochastic multiplier unit 600B further comprises an AND gate 602B. The AND gate is configured to receive the two K bits representing the two real numbers Xi and Yj and to perform an AND operation between the two K bits. The result or output of the AND operation are K bits which are provided as input to a counter 603B of the stochastic multiplier unit 600B. The counter 603B is configured to count the number of ones in the result of the AND operation. The counter 603B is further configured to receive the sign of the product that results from the XOR operation, wherein the counting of ones is performed in accordance with the received sign of the product. For example, the counter 603B counts in a positive direction if the sign of product is present and received otherwise the counter 603B counts in the negative direction. The resulting count of ones may be provided as input to a multiplication circuit 604B of the stochastic multiplier unit 600B. The multiplication circuit 604B is further configured to receive a predefined Fscale value 610B. The multiplication circuit 604B is further configured to multiply the count of ones by the Fscale value 610B to get a final product and to store the result (final product) of the multiplication in a latch 605B of the stochastic multiplier unit 600B.

Figure 6D:
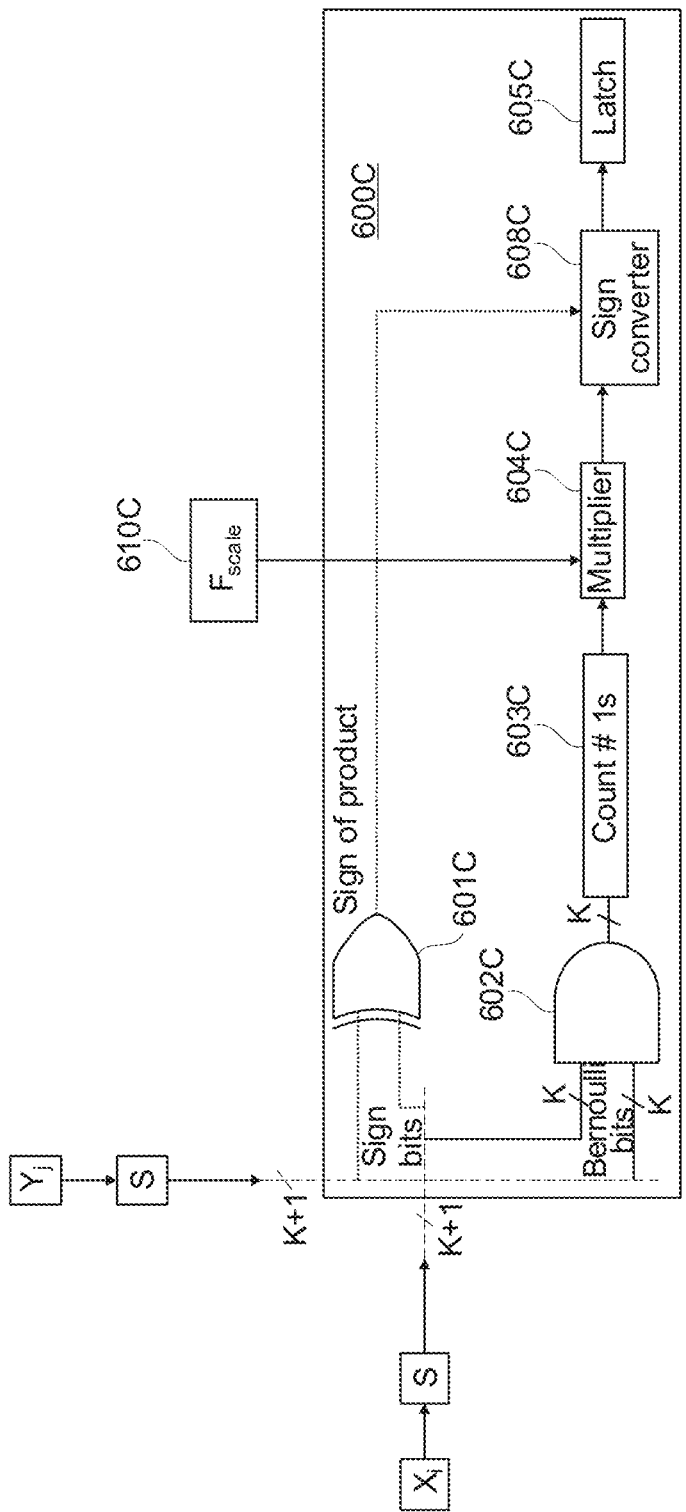
FIG. 6D depicts a diagram of an example stochastic multiplier unit in accordance with the present subject matter.

FIG. 6D depicts a diagram of an example stochastic multiplier unit 600C in accordance with the present subject matter.

The stochastic multiplier unit 600C is configured to receive two sets of K+1 bits representing the real number Xi and Yj respectively. The sets of bits may be produced as described herein by a converter in accordance with the present disclosure. The sets of bits may be stochastic representations of respective real numbers.

The stochastic multiplier unit 600C comprises an XOR gate 601C. The XOR gate 601C is configured to receive the sign bits of the real number Xi and Yj respectively and to perform an XOR operation between the sign bits in order to provide an output indicative of a sign of the product of the two real numbers $X_i$ and $Y_j$.

The stochastic multiplier unit 600C further comprises an AND gate 602C. The AND gate is configured to receive the two K bits representing the two real numbers Xi and Yj and to perform an AND operation between the two K bits. The result or output of the AND operation are K bits that are provided as input to a counter 603C of the stochastic multiplier unit 600C. The counter 603C is configured to count the number of ones in the result of the AND operation. The resulting count of ones may be provided as input to a multiplication circuit 604C of the stochastic multiplier unit 600C. The multiplication circuit 604C is further configured to receive a Fscale value 610C. The multiplication circuit 604 is further configured to multiply the count of ones by the Fscale value 610C to get a final product. The stochastic multiplier unit 600C further comprises a sign converter 608C which converts the sign of the final product obtained from the multiplication circuit 604. The conversion of the sign of the final product is performed based on the sign of the product as obtained by the sign converter 608 from the XOR gate 601C. The resulting product of the sign converter 608C may be stored in the latch 605C.

Figure 6E:
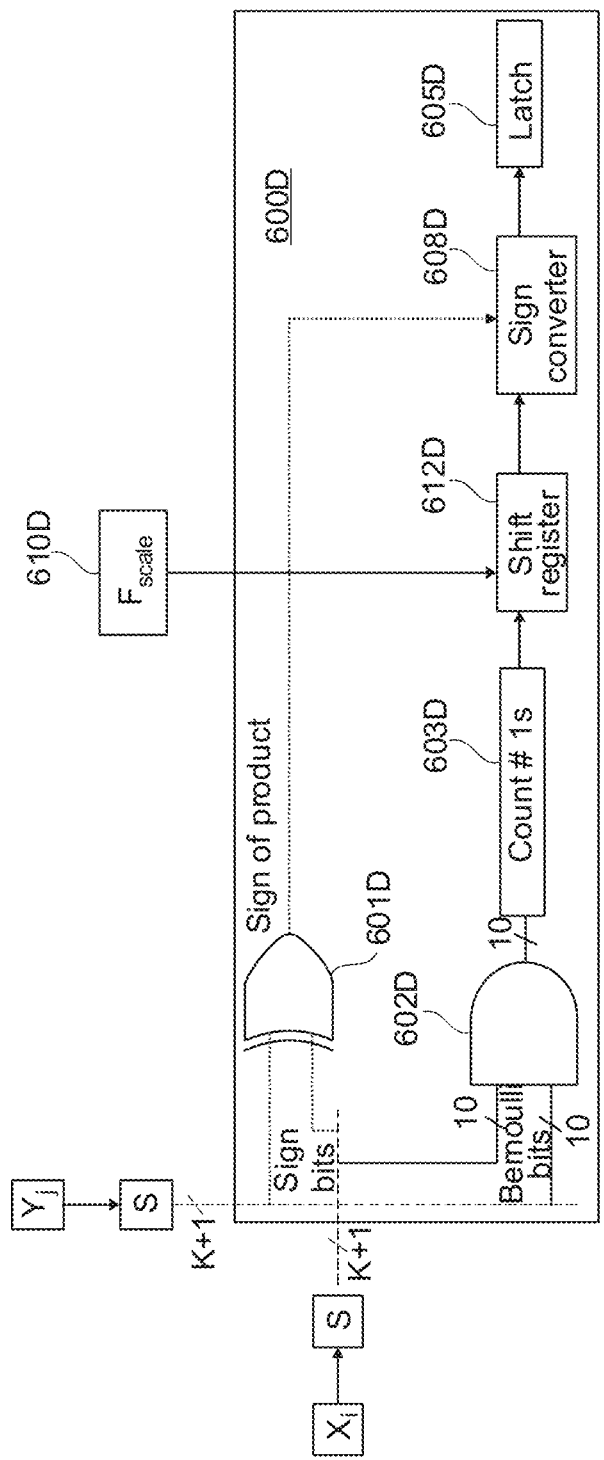
FIG. 6E depicts a diagram of an example stochastic multiplier unit in accordance with the present subject matter.

FIG. 6E depicts a diagram of an example stochastic multiplier unit 600D in accordance with the present subject matter.

The stochastic multiplier unit 600D is configured to receive two sets of K+1 bits representing the real number $X_i$ and $Y_j$ respectively. The sets of bits may be produced, as described herein, by a converter in accordance with the present disclosure. The sets of bits may be stochastic representations of respective real numbers.

The stochastic multiplier unit 600D comprises an XOR gate 601D. The XOR gate 601D is configured to receive the sign bits of the real number Xi and Yj respectively and to perform an XOR operation between the sign bits in order to provide an output indicative of a sign of the product of the two real numbers $X_i$ and $Y_j$.

The stochastic multiplier unit 600D further comprises an AND gate 602D. The AND gate is configured to receive the two K bits representing the two real numbers Xi and Yj and to perform an AND operation between the two K bits. The result or output of the AND operation is K bits that are provided as input to a counter 603 of the stochastic multiplier unit 600D. The counter 603D is configured to count the number of ones in the result of the AND operation. The resulting count of ones may be provided as input to a shift register 612D of the stochastic multiplier unit 600D. The shift register 612D is further configured to receive a Fscale value 610D. The shift register 612D is further configured to shift (right shift) the counter output by the 2th power in the Fscale value 610D and to shift (left shift) the Fscale value 610D by the 2th power in the counter output. The stochastic multiplier unit 600D further comprises a sign converter 608 which converts the sign of the output obtained from the shift register 612D. The conversion of the sign of that output is performed based on the sign of the product as obtained by the sign converter 608D from the XOR gate 601D. The resulting product of the sign converter 608D may be stored in the latch 605D.

Figure 6F:
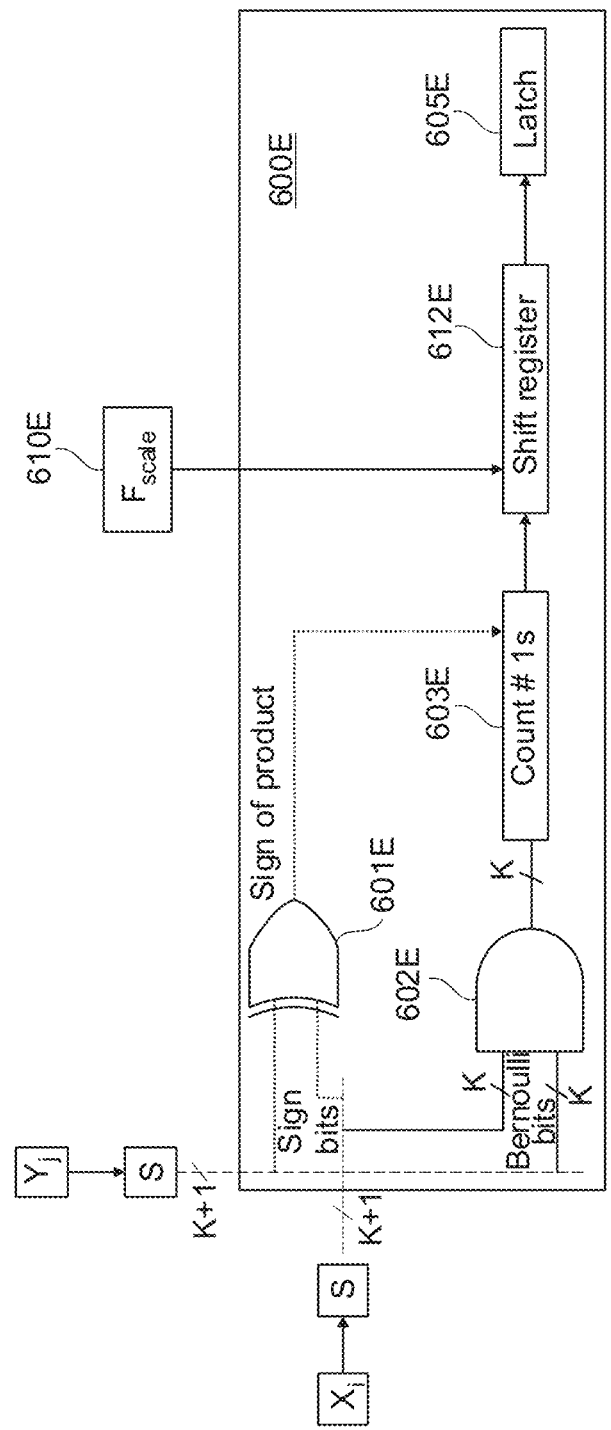
FIG. 6F depicts a diagram of an example stochastic multiplier unit in accordance with the present subject matter.

FIG. 6F depicts a diagram of an example stochastic multiplier unit 600E in accordance with the present subject matter.

The stochastic multiplier unit 600E is configured to receive two sets of K+1 bits representing the real number Xi and Yj respectively. The sets of bits may be produced as described herein by a converter in accordance with the present disclosure. The sets of bits may be stochastic representations of respective real numbers.

The stochastic multiplier unit 600E comprises an XOR gate 601E. The XOR gate 601E is configured to receive the sign bits of the real number Xi and Yj respectively and to perform an XOR operation between the sign bits in order to provide an output indicative of a sign of the product of the two real numbers $X_i$ and $Y_j$.

The stochastic multiplier unit 600E further comprises an AND gate 602E. The AND gate is configured to receive the two K bits of representing the two real numbers Xi and Yj and to perform an AND operation between the two K bits. The result or output of the AND operation is K bits that are provided as input to a counter 603E of the stochastic multiplier unit 600E. The counter 603E is configured to count the number of ones in the result of the AND operation. The counter 603E is further configured to receive the sign of the product that results from the XOR operation, wherein the counting of ones is performed in accordance with the received sign of the product. For example, the counter 603E counts in positive direction if the sign of product is present and received otherwise the counter 603E counts ones in the negative direction. The resulting count of ones may be provided as input to a shift register 612E of the stochastic multiplier unit 600E. The shift register 612E is further configured to receive a Fscale value 610E. The shift register 612E is further configured to shift (right shift) the counter output by the 2th power in the Fscale value 610E and to shift (left shift) the Fscale value 610E by the 2th power in the counter output. The output of the shift register 612E may be stored in a latch 605E of the stochastic multiplier unit 600E.

As described herein the conversion of the real numbers into a set of Bernoulli bits may use a random number generator. The converter that performs the conversion may comprise the real number generator as described with reference to FIGS. 5A-C. In case of a crossbar of stochastic multiplier units having multiple converters as described with reference to FIG. 4, it may be advantageous not to provide each converter with a random generator number and to provide a distribution of the random generator numbers that enable to share some random number generators to be shared among multiple converters as described with reference to FIGS. 7A-D.

FIG. 7A depicts an electronic system 700A similar to the system described with reference to FIG. 4. In the example of FIG. 7A it is assumed that N=M. In addition, FIG. 7A illustrates with dashed lines the converters that share a same random generator number.

With the example of FIG. 7A, demands for 2N random number generators can be reduced, by just using N random number generators. For example, only the second set of second converters 401A-N may comprise respective N random number generators. For example, the N random number generators may first be used (e.g. each generator may generate K random numbers) to compute Bernoulli sequences for N elements along the word lines. Then previously computed K values from the N random number generators may be used to compute Bernoulli sequences for remaining N elements associated with the bit lines e.g. each converter of the first set of converters 403A-M may receive a previously generated K random numbers from one of the second converters 401A-N. In one example, and as illustrated in FIG. 7A, each second converter 403A-N may receive the previously generated K random numbers from a respective first converter 401A-N(in a one to one relation). This processing may be parallelized by sharing output of these random number generators across word and bit lines as shown by dotted lines. For example, the K random numbers generated by the random number generator of the converter 401A may be used by the converter 403A in order to generate the set of bits for the real number $Y_1$. And the K random numbers generated by the random number generator of the converter 401N may be used by the converter 403N in order to generate the set of bits for the real number $Y_N$.

However, using N random number generators for full outer product computations may be an expensive demand for some applications. This number may thus advantageously be reduced in particular as backpropagation in deep neural networks may help compensating for loss of independence. In this case, another scheme to use a single random number generator may be used for computation as described with reference to FIG. 7B.

Figure 7B:
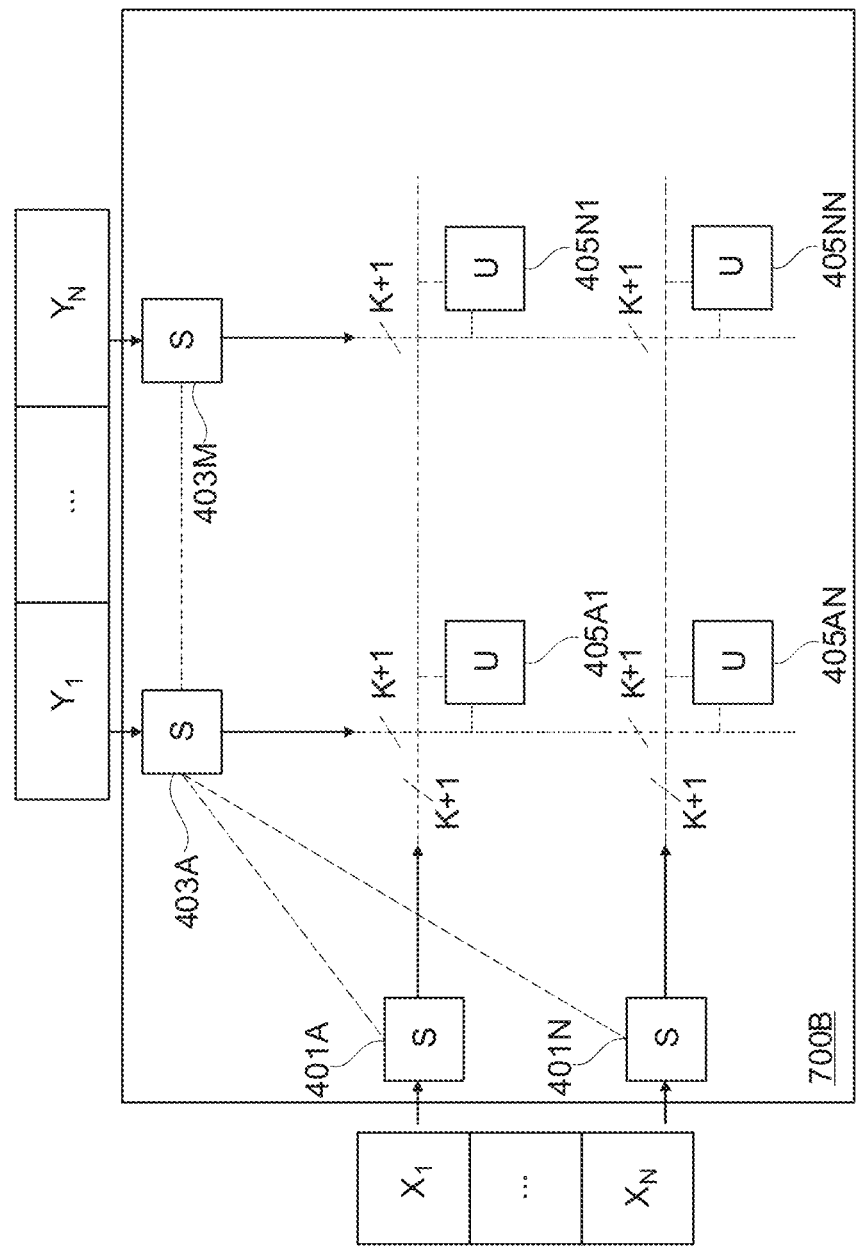
FIG. 7B depicts an electronic system with an example configuration of random number generators in accordance with the present subject matter.

FIG. 7B depicts an electronic system 700B similar to the system described with reference to FIG. 4. In the example of FIG. 7B it is assumed that N=M. In addition, FIG. 7B illustrates with dashed lines the converters that share a same random generator number.

With the example of FIG. 7B, demands for 2N or N random number generators can be reduced by just using a single random number generator. For example, only a single first converter of the first set of converters 403A-N may comprise a random number generator. Thus, instead of using multiple random number generators, a full outer product can be performed using only one random number generator. This can be done by using just a single random number generator and sharing it across all word and bit lines as shown by dotted line in FIG. 7B. One stochastic converter e.g. converter 403A generates K random values and those are shared across all 2N stochastic converters 401A-N and 403A-N. For example, the single random number generator may compute K uniformly distributed random numbers and all stochastic bit generators (namely the converters 401A-N and 403A-N) compute required Bernoulli sequence using only these K random numbers. For example, the converter 403A may generate the K Bernoulli bits by comparing the real number $Y_1$ that it received with the K random numbers. And converter 401N may compare its received real number $X_N$ with these same K random numbers that are shared by the converter 403A and so similarly the other converters generate respective K bits.

The system of FIG. 7B may be advantageous as it may reduce area and energy demands of hardware significantly compared to schemes using 2N or N random number generators.

FIG. 7C depicts an electronic system 700C similar to the system described with reference to FIG. 4. In the example of FIG. 7C it is assumed that N=M. In addition, FIG. 7C illustrates with dashed lines the converters that share a same random generator number.

Figure 7D:
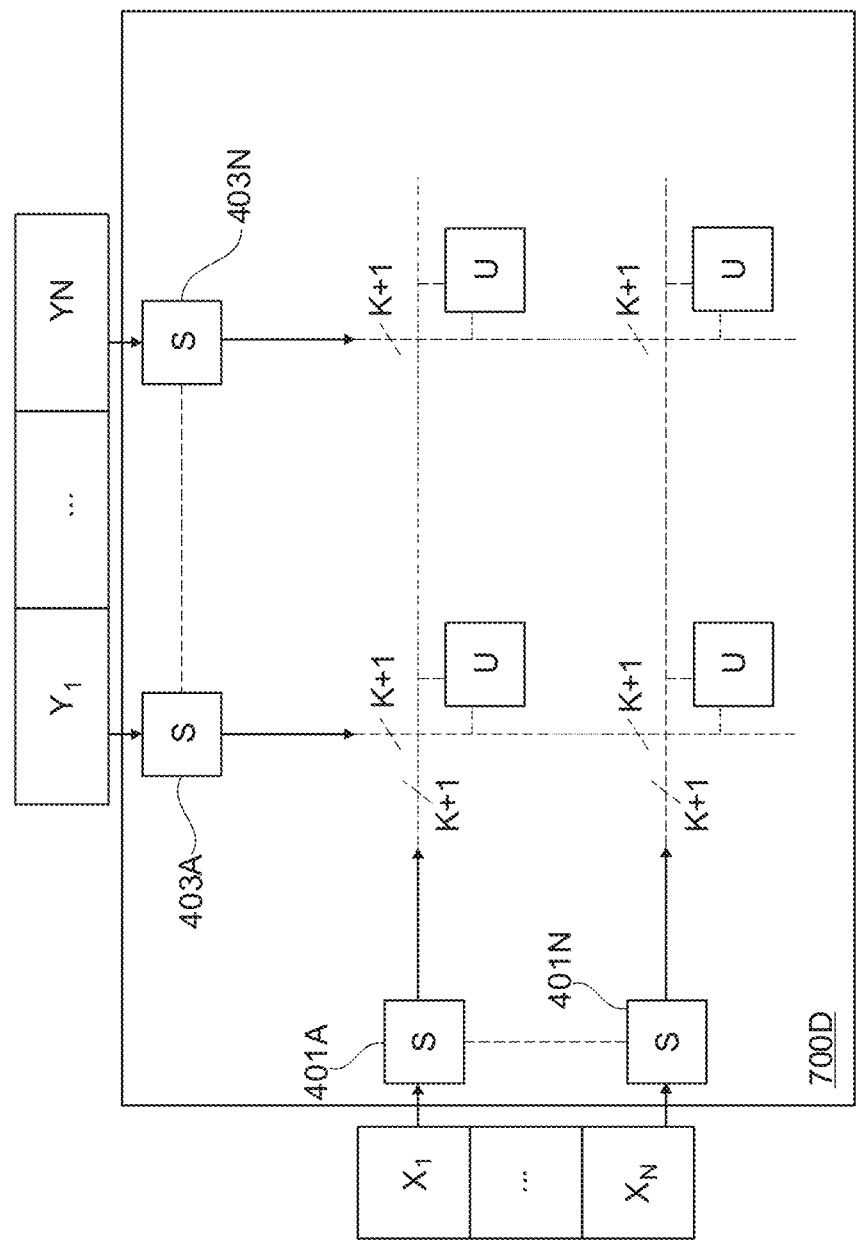
FIG. 7D depicts an electronic system with an example configuration of random number generators in accordance with the present subject matter.

In the example of FIG. 7C only N/c random number generators across bit lines are used and other N/c random number generators across word lines are used, where c is an integer number e.g. c=2 (FIG. 7D shows example of N/c=1). In other terms, every c consecutive row lines of the crossbar 700C may share random values generated by a single random number generator. And every c consecutive column lines of the crossbar may share random values generated by a single random number generator. For example, each random number may be shared between two consecutive bit lines (or word lines). This is indicated by dotted lines of the FIG. 7C.

As illustrated in FIG. 7C, converters 403A and 403B share the same generated random numbers. The converter 403A comprises the random number generator and the converter 403B does not comprise a random number generator (which is illustrated by the small box size of converter 403B). For example, the random number generator of converter 403A may compute K uniformly distributed random numbers and both converters 403A and 403B compute required Bernoulli sequence using these same K random numbers.

FIG. 7D depicts an electronic system 700D similar to the system described with reference to FIG. 4. In the example of FIG. 7D it is assumed that N=M. In addition, FIG. 7D illustrates with dashed lines the converters that share a same random generator number.

In the example of FIG. 7D only two random number generators are used. There is only one random number generator shared across all bit lines and another one shared across all word lines. In other terms, all row lines of the crossbar may share random values generated by a single random number generator and all column lines of the crossbar may share random values generated by a single random number generator. For example, only first converter 403A of the first set of first converters may comprise a random number generator and only second converter 401A of the second set of second converters may comprise a random number generator.

For example, the random number generator of the converter 403A computes K uniformly distributed random numbers and all stochastic bit generators (the converters 403A-N) compute required Bernoulli sequence using only these K random numbers. The random number generator of the converter 401A computes K uniformly distributed random numbers and all stochastic bit generators of the converters 401A-N compute required Bernoulli sequence using only these K random numbers.

Figure 8:
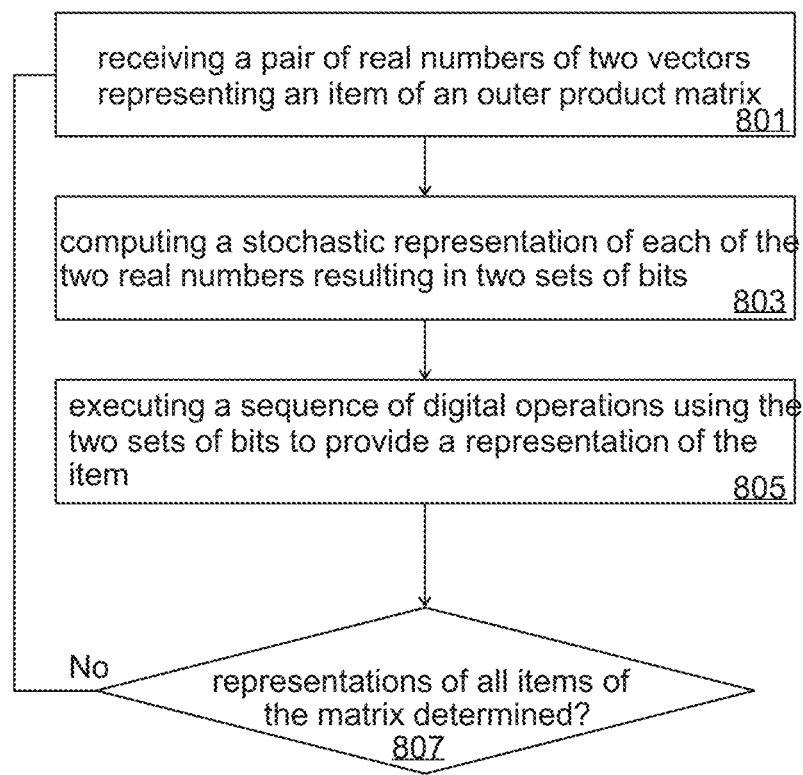
FIG. 8 is a flowchart of a method for computing items of an outer product matrix using an electronic system in accordance with the present subject matter.

FIG. 8 is a flowchart of a method for computing items of an outer product matrix using an electronic system. For each item of at least part of the items of the matrix steps 801 to 805 may be executed.

In step 801, an electronic system may receive a pair of real numbers of two vectors. The pair corresponds to the each item. In step 803, the electronic system may compute a stochastic representation of each of the two real numbers resulting in two sets of bits. For example, the sets of bits may be stochastic bit streams wherein each of the two stochastic bit streams comprises a random variable characterized by a Bernoulli process. The set of bits comprises a subset of bits representing the real number and a sign bit indicative of the sign of the real number. In step 805, the electronic system may perform a multiplication operation by executing a sequence of digital operations using the two sets of bits to provide a representation of said item. The digital operations are performed such that the provided representation of the item is a value that has a format of the multiplied real numbers.

If (inquiry step 807) the representations of all items of the matrix are not yet determined steps 801-805 may be repeated for each item of the remaining items of the matrix.

In case the at least part of items comprises a subset of items (e.g. a single item), steps 801-805 may be repeated for each remaining item (which is not part of the subset) of the matrix. In case the at least part of items comprises a subset of more than one item of the matrix, each of the steps 801 to 805 may be performed in parallel for each item of the subset.

Figure 9A:
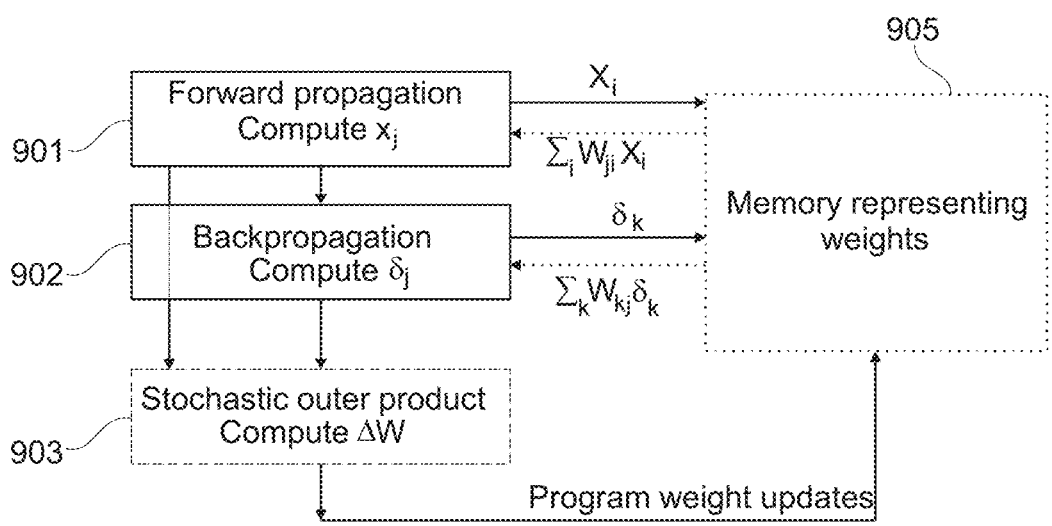
FIG. 9A depicts a diagram illustrating the usage of the present method for computing outer products required for synaptic updates of a deep neural network.

FIG. 9A depicts a diagram illustrating the usage of the present method for computing outer products required for synaptic updates of a deep neural network. For example, each layer in a deep neural network computes an outer product of activations $x_i$ and gradients $\delta_j$ to compute gradients for weights. Such a computation may be performed by using a crossbar of stochastic multiplier units (e.g. of FIG. 4) inside the "stochastic outer product" block 903.

As shown in FIG. 9A, a forward propagation block 901 may compute an activation $x_j$ by using weights $W_{ji}$ from the memory of weights 905. This computation may be performed using equation (1). A backward propagation block 902 may compute a gradient $\delta_j$ by using weights $W_{kj}$ from the memory of weights 905. This computation may be performed using equation (2). The computed activation $x_j$ and gradient $\delta_j$ may be provided as input to the "stochastic outer product" block 903. The "stochastic outer product" block 903 may compute the Bernoulli representations of received activation $x_j$ and gradient $\delta_j$ using equations (3) and (4). For outer product computation, the product of the two numbers $(x_i, \delta_j)$ is obtained by computing bitwise AND of two corresponding Bernoulli sequences $(x_{iB}, \delta_{jB})$ of length K and averaging the result over final K bits. This is indicated by the equations (5). The computed $\Delta W$ is then feedback to the memory of weights 905.

Figure 9B:
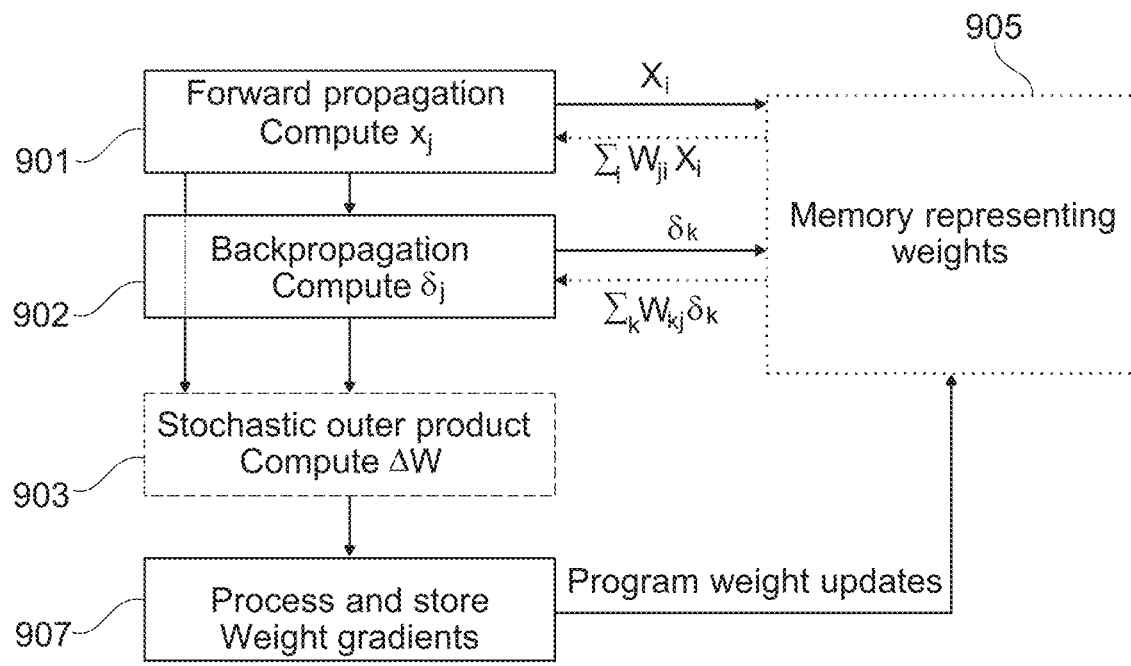
FIG. 9B depicts a diagram illustrating the usage of the present method in computing outer products required in mixed precision architectures.

FIG. 9B depicts a diagram illustrating the usage of the present method in computing outer products required in mixed precision architectures (MPAs). MPAs may use mixed precision methods to combine the use of different numerical formats for performing computation. For example, the mixed precision methods may involve an outer product computation. This outer product computation may be performed in mixed precision architectures using stochastic computing in accordance with the present subject matter e.g. as described with reference to FIG. 9A. FIG. 9B is similar to FIG. 9A with the exception that in FIG. 9B the computed $\Delta W$ is feedback to the memory of weights 905 by a process and store component 907 that receives ΔW from the "stochastic outer product" block 903.

Figure 9C:
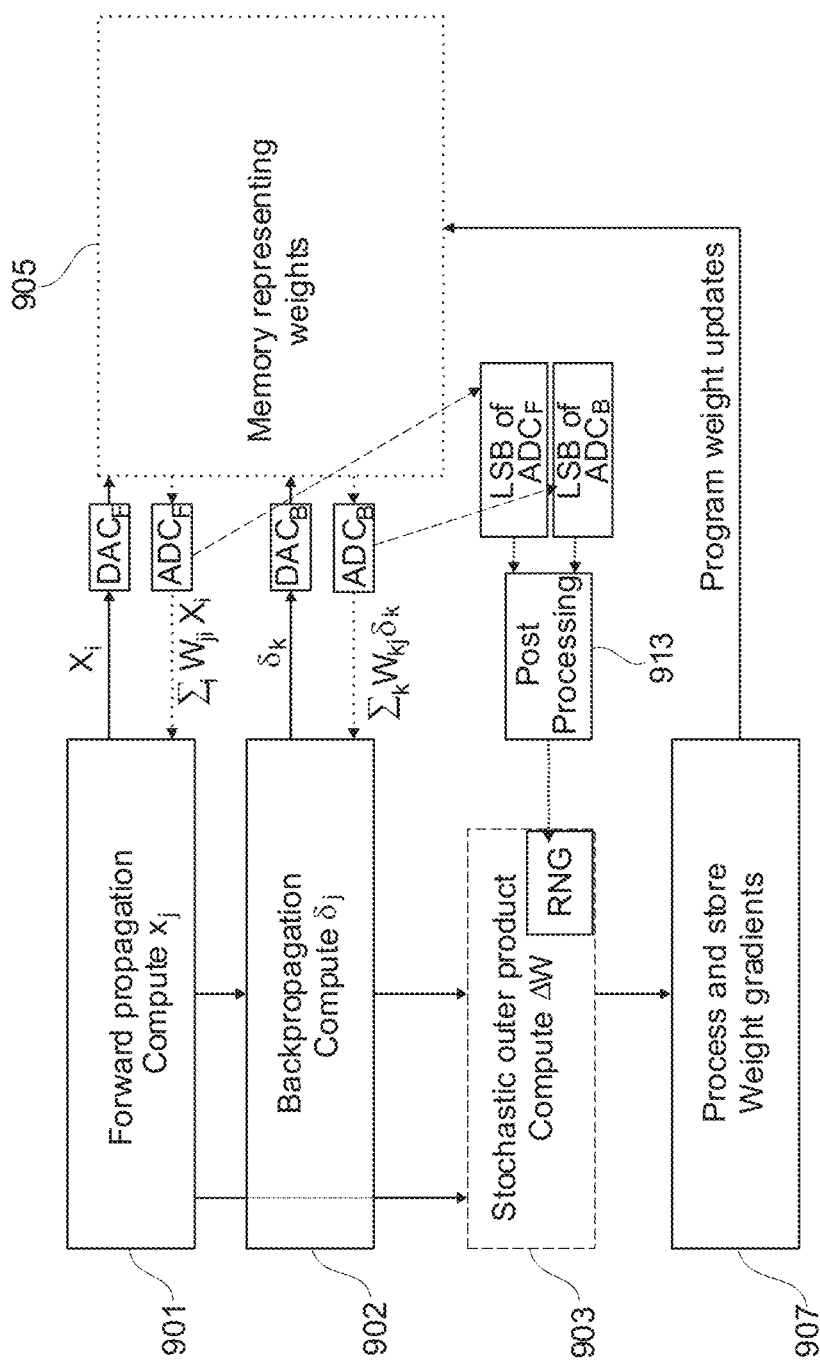
FIG. 9C depicts a diagram illustrating the usage of the present method in computing outer products required in mixed precision architectures.

The system of FIG. 9B may be advantageous for generating random numbers for the crossbar array of block 903. This is because, the last few bits of ADC can get affected by noise depending upon the noise in the input signal and MPAs use ADC in forward and backward propagation ($ADC_F$, $ADC_B$) as shown in FIG. 9C. Thus, instead of using a dedicated hardware for random number generation in MPAs, a least significant bit (LSB) of ADC can be used to generate sequences of uniformly distributed random bits. Since there are at least two ADCs, as shown in FIG. 9C, per weight layer, LSBs of both ADCs can be multiplexed and processed (in post processing block 913), to generate a sequence of uniformly distributed random numbers. Such a generated sequence can be stored during forward and/or backpropagation to use it for computation while computing outer product in block 103. FIG. 9C shows that each of the forward and backward propagation blocks 901 and 902 associated with two ADCs, one for the storage of data in the memory 905 and the other for the received data from the memory 905. LSBs, of the two ADCs use for reception of data from the memory 905 may be multiplexed and processed in post processing block 913 to generated random numbers which can be used by the crossbar of block 903 for computing the stochastic representations of real numbers.

Figure 10A:
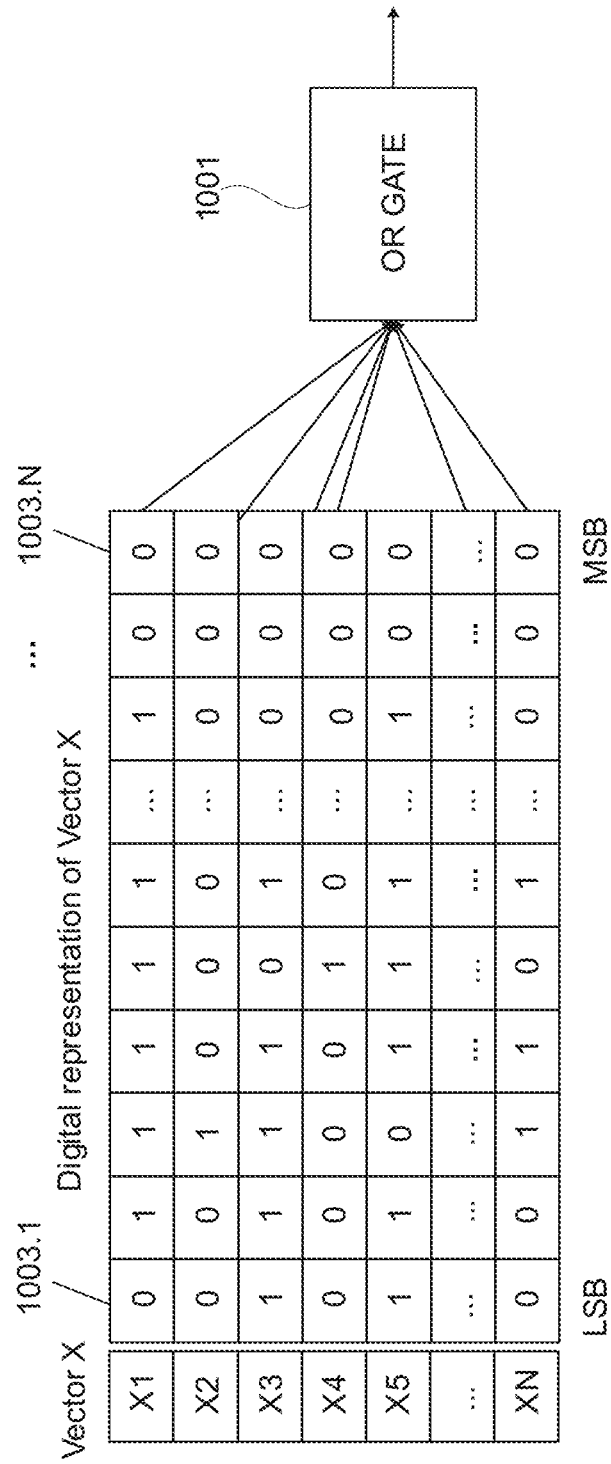
FIG. 10A depicts a diagram illustrating a method for computing the scale factor in accordance with the present subject matter.

FIG. 10A depicts a diagram illustrating a method for computing an approximation of the scale factor: $F_{scale}=(X_{max} \times Y_{max})/K$ as $F_{scale}= 2^{(Floor(log\ 2(Xmax))+Floor(log\ 2(Ymax))-Floor(log\ 2(K)))}$. For that the 2th power in the maximum values $X_{max}$ and $Y_{max}$ of two vectors X and Y may be computed. As used herein the term 2th Power(G) or 2th power in G refers to the power of 2 in G. For example, if G=16, the 2thpower(G) is 4. The 2thpower(G) can be approximated as Floor(log 2(G)) as this computes power of 2 in G, where the floor of an element denotes rounding that element to the nearest integer less than or equal to that element.

As shown in FIG. 10A, for computing the 2th power in $X_{max}$, bits of all elements X1, X2 . . . XN in vector X that belong to a each column 1003.1 to 1003.N (bits of a same column have a same index, wherein the index is indicative of the column e.g. indicative of the location of the column) may be feed column by column to an OR gate 1001 to find the highest MSB present in the vector X. For that, one keep feeding these bits from same index/column of all elements in vector X until OR gate outputs 1. For example, the bits of column 1003.N are first fed to the OR gate and if 1 is not the output of the OR operation of the bits of column 1003.N, a next column e.g. 1003.N−1 may be fed to the OR gate and so on. Once the OR gate outputs 1, that index may be stored as it is maximum 2th power in X. The same method may be used to compute the 2thpower(Ymax).

Figure 10B:
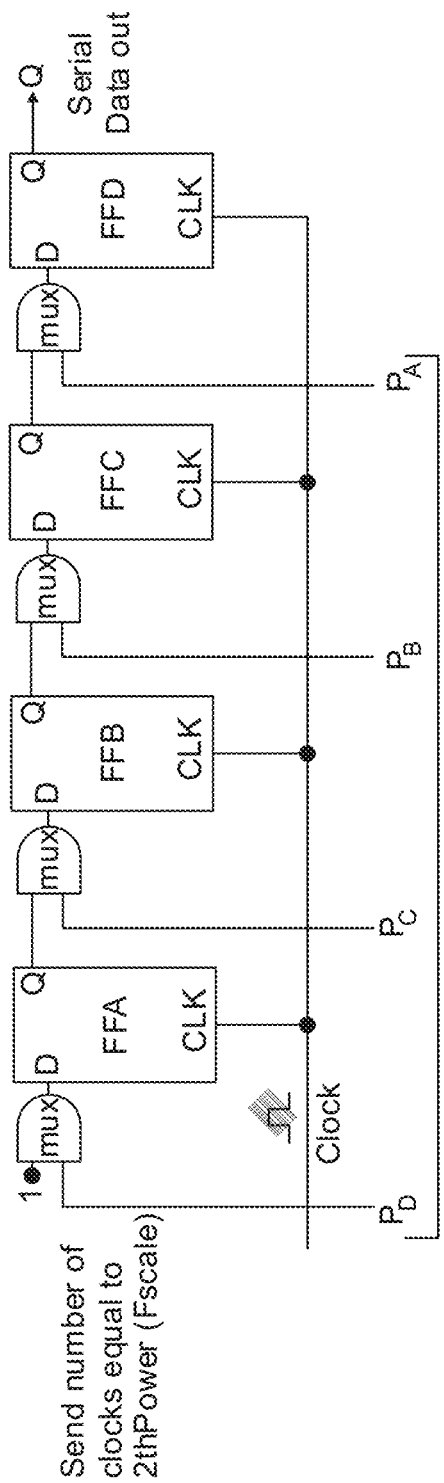
FIG. 10B depicts a diagram of a shift register for performing a right shift operation in accordance with the present subject matter.
Figure 10C:
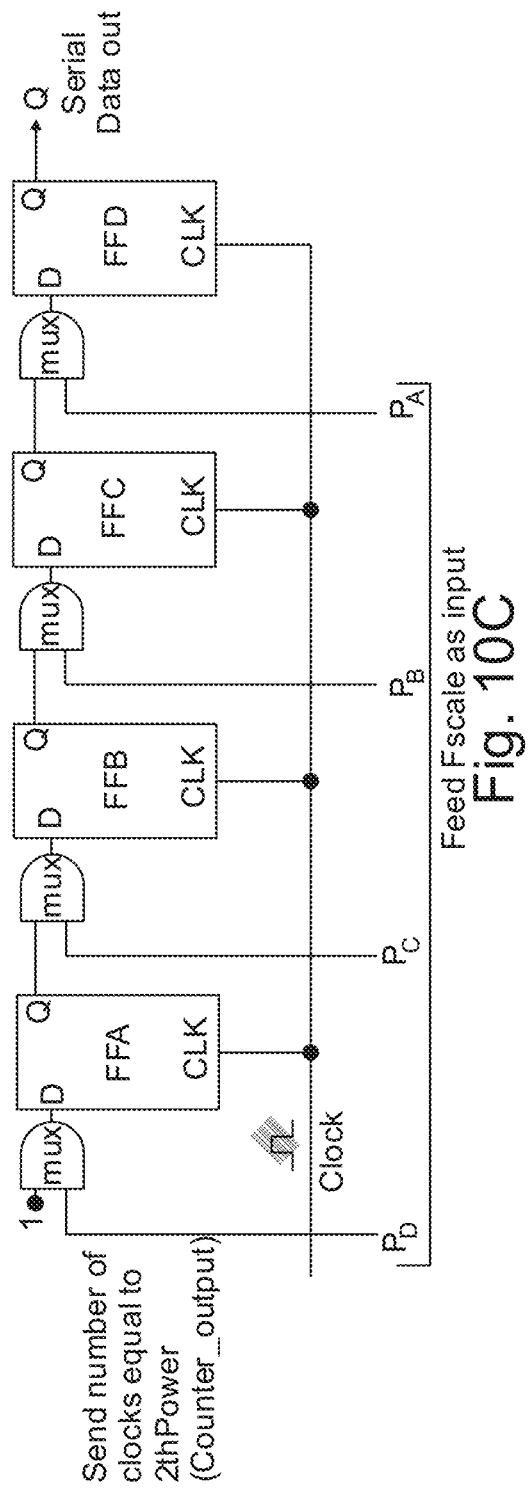
FIG. 10C depicts a diagram of a shift register for performing a left shift operation in accordance with the present subject matter.

FIGS. 10B-C depicts a diagram of a shift register for performing a right shift operation and the left shift operation respectively. In FIG. 10B, the shift register is fed by a count of ones which may be the output of a counter e.g. 603A-E. And a number of clocks equal to the Floor(log 2(Fscale)) are sent to the shift register. The output of the shift register may then be the shift value counter_output>>Fscale which may be stored in a latch. In FIG. 10C, the shift register is fed by the Fscale. And a number of clocks equal to the 2thpower (count of ones) are sent to the shift register. The output of the shift register may then be the shift value Fscale<<Floor(log 2(counter_output)) which may be stored in a latch.

The sequence length K appears in the de-numerator of the variance of the stochastic multiplication i.e. the variance is inversely proportional to the length of the sequence K, and thus it may directly affect the variance values e.g. the higher the value of K the smaller the variance. However, for the computations of vector products, the variance of errors in the results is inversely proportional to not just the length of the sequence K but to the product of the length of sequence K and the length of the vector of numbers. Thus, in the case of limited resources for computing stochastic products, a higher length of the vectors may reduce the error in computation without having to change the sequence length K. For example, in case of training neural networks, and as indicated by the following equations (1) to (4), the variance is inversely proportional to the product of the sequence length K and the batch size H. Thus, controlling (increasing) the batch size may compensate for small a Bernoulli sequence length, and reduce the variance of errors in the computation (see following equation (4)) when using stochastic computing.

$x_{iB}$=BernoulliSequence $(x_i)$ $\delta_{jB}$=BernoulliSequence $(\delta_j)$ (1)

For batch size 1:

$$\Delta W_{ji} = \frac{1}{K}\sum_{l=1:K} x_{iB}^l \delta_{jB}^l = E[\xi_{ji}]_1 \quad (2)$$

Where, $\xi_{ji}=x_{iB}$ AND $\delta_{jB}$, subscript 1 denotes instance in batch For H batches:

$$\Delta W_{ji} = \frac{1}{H}\sum_{k=1:H} E[\xi_{ji}]_k = E[E[\xi_{ji}]_k] \quad (3)$$

Since this expectation in (3) is calculated over H x K Bernoulli events, $$\text{var}(\Delta W_{ji}) \propto \frac{1}{H \times K} \quad (4)$$

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An electronic system for computing items of an outer product matrix, for each item of at least part of a plurality of items of a matrix, the electronic system being configured to:
   receive a pair of real numbers of two vectors, the pair corresponding to said item;
   compute a stochastic representation of the real numbers resulting in two sets of bits, each set of bits comprising a subset of bits representing the corresponding real number and a sign bit indicative of a sign of the corresponding real number; and
   perform a multiplication operation by a sequence of digital operations using the two sets of bits to provide a representation of said item, the digital operations comprising an AND operation and a data formatting operation for mapping an output of the AND operation to the representation of said item;
   the electronic system further comprising, for each item of the at least part of the plurality of items, two stochastic converters and a stochastic multiplier unit, wherein each of the stochastic converters is configured to perform the receiving of a respective real number of the pair of real numbers and the computation of the stochastic representation of the received real number, wherein the stochastic multiplier unit is configured to receive the two sets of bits to perform the sequence of digital operations, and wherein the stochastic multiplier unit comprises an AND logic configured to perform the AND operation between the two subsets of bits and a count circuit being configured to count a number of ones in a result of the AND operation, wherein the stochastic multiplier unit further comprises a multiplication circuit to multiply the count of ones by a predefined scale factor associated with an output of a logic operation between the sign bits of the sets of bits.

2. The electronic system of claim 1, the at least part of the plurality of items comprising one of: a single item, a subset of items of the matrix and all items of the matrix.

3. The electronic system of claim 1, the at least part of the plurality of items comprising a set of N items forming a row of the matrix, the electronic system comprising a row of the stochastic multiplier units and a first set of the stochastic converters and another stochastic converter, wherein each stochastic multiplier unit of a set of stochastic multiplier units is configured to receive one of the received two sets of bits from a respective stochastic converter of the first set and to receive the other set of bits from the another stochastic converter.

4. The electronic system of claim 1, the at least part of the plurality of items comprising N×M items forming the matrix, the electronic system comprising a crossbar of N×M of the stochastic multiplier units and a first set of N of the stochastic converters and a second set of M of the stochastic converters, wherein each stochastic multiplier unit of the crossbar is configured to receive one of the received two sets of bits from a respective stochastic converter of the first set and the other set of bits from a respective stochastic converter of the second set.

5. The electronic system of claim 4, wherein each stochastic converter of the first and second sets of stochastic converters comprises a random number generator, the stochastic converter being configured to compute the stochastic representation by comparing the real number it receives with multiple random numbers generated by the random number generator, thereby generating the set of bits.

6. The electronic system for claim 4, wherein N stochastic converters of the first set comprise respective random number generators, wherein each stochastic converter of the first set is configured to compute the stochastic representation by comparing the real number it receives with multiple random numbers generated by its random number generator, thereby generating the set of bits, wherein each stochastic converter of the second set is configured to compute the stochastic representation by comparing the real number it receives with the multiple random numbers generated by the random number generator of a stochastic converter of the first set, thereby generating the set of bits.

7. The electronic system of claim 4, the crossbar comprising row lines and column lines, wherein each row line is connected to a respective converter of the second set, and each column line is connected to a respective converter of the first set, the row lines comprising one or more subsets of row lines, the column lines comprising one or more subsets of column lines, wherein only one of the converters of the first set that are connected to each subset of column lines comprises a random number generator and/or only one of the converters of the second set that are connected to each subset of row lines comprises a random number generator, wherein each converter of the first set is configured to perform the stochastic computation by comparing the real number it receives with multiple random numbers generated by its random number generator or by the random number generator of another converter of the first set of the subset of column lines to which the other converter of the first set is connected or by the random number generator of another converter of the second set, thereby generating the set of bits, wherein each converter of the second set is configured to perform the stochastic computation by comparing the real number it receives with multiple random numbers generated by its random number generator or by the random number generator of another converter of the second set of the subset of row lines to which the other converter of the second set is connected or by the random number generator of another converter of the first set, thereby generating the set of bits.

8. The electronic system of claim 4, wherein a stochastic converter of the first set and another stochastic converter of the second set comprise a first and second random number generator respectively, wherein each stochastic converter of the first set is configured to compute the stochastic representation by comparing the real number it receives with multiple random numbers generated by the first random number generator, thereby generating the set of bits, wherein each stochastic converter of the second set is configured to compute the stochastic representation by comparing the real number it receives with multiple random numbers generated by the second random number generator, thereby generating the set of bits.

9. The electronic system of claim 1, wherein each converter of the converters comprises a comparator being configured to:
receive the real number,
receive multiple random numbers from a random number generator of the converter;
sample each of the random numbers in accordance with a predefined real number maximum size;
compare each of the sampled random numbers with the received real number, resulting in the subset of bits representing the real number.

10. The electronic system of claim 1, wherein each converter of the converters comprises a normalization logic, comparator and a random number generator, the normalization logic being configured to receive the real number and to normalize the real number such that it lies in a predefined range, the comparator being configured to receive the normalized number from the normalization logic, receive multiple random numbers from the random number generator, and to compare the received normalized number with each received random number resulting in the subset of bits representing the real number.

11. The electronic system of claim 10, wherein the normalizing comprises dividing the real number by a predefined number and accommodating a sign change of the real number, wherein the predefined range is [0, 1].

12. The electronic system of claim 10, wherein the normalizing comprises dividing the real number by a predefined number, wherein the predefined range is [−1, 1] wherein the comparator being configured to accommodate a sign change of the real number to compare two positive numbers.

13. An electronic system for computing items of an outer product matrix, for each item of at least part of a plurality of items of a matrix, the electronic system being configured to:
receive a pair of real numbers of two vectors, the pair corresponding to said item;
compute a stochastic representation of the real numbers resulting in two sets of bits, each set of bits comprising a subset of bits representing the corresponding real number and a sign bit indicative of a sign of the corresponding real number;

perform a multiplication operation by a sequence of digital operations using the two sets of bits to provide a representation of said item, the digital operations comprising an AND operation and a data formatting operation for mapping an output of the AND operation to the representation of said item; and a stochastic multiplier unit for each item of the at least part of the plurality of items for performing the sequence of digital operations, the stochastic multiplier unit comprising an XOR gate to perform an XOR operation between the sign bits of the sets of bits, an AND logic configured to perform the AND operation between the two subsets of bits, a counter being configured to count a number of ones in a result of the AND operation, a multiplication circuit to multiply the count of ones by a predefined scale factor associated with an output of the XOR operation.

14. An electronic system for computing items of an outer product matrix, for each item of at least part of a plurality of items of a matrix, the electronic system being configured to:

receive a pair of real numbers of two vectors, the pair corresponding to said item;

compute a stochastic representation of the real numbers resulting in two sets of bits, each set of bits comprising a subset of bits representing the corresponding real number and a sign bit indicative of a sign of the corresponding real number;

perform a multiplication operation by a sequence of digital operations using the two sets of bits to provide a representation of said item, the digital operations comprising an AND operation and a data formatting operation for mapping an output of the AND operation to the representation of said item; and a stochastic multiplier unit for each item of the at least part of the plurality of items for performing the sequence of digital operations, the stochastic multiplier unit comprising an XOR gate to perform an XOR operation between the sign bits of the sets of bits, an AND logic configured to perform the AND operation between the two subsets of bits, a count circuitry being configured to count a number of ones in a result of the AND operation in positive or negative direction depending on an output of the XOR operation, a multiplication circuit to multiply the count of ones by a predefined scale factor.

15. An electronic system for computing items of an outer product matrix, for each item of at least part of a plurality of items of a matrix, the electronic system being configured to:

receive a pair of real numbers of two vectors, the pair corresponding to said item;

compute a stochastic representation of the real numbers resulting in two sets of bits, each set of bits comprising a subset of bits representing the corresponding real number and a sign bit indicative of a sign of the corresponding real number;

perform a multiplication operation by a sequence of digital operations using the two sets of bits to provide a representation of said item, the digital operations comprising an AND operation and a data formatting operation for mapping an output of the AND operation to the representation of said item; and a stochastic multiplier unit for each item of the at least part of the plurality of items for performing the sequence of digital operations, the stochastic multiplier unit comprising an XOR gate to perform an XOR operation between the sign bits of the sets of bits, an AND logic configured to perform the AND operation between the two subsets of bits, a count circuitry being configured to count a number of ones in a result of the AND operation in positive or negative direction depending on an output of the XOR operation, a shift register to shift the count of ones by 2th power in a predefined scale factor or to shift the scale factor by the 2th power in the count.

16. An electronic system for computing items of an outer product matrix, for each item of at least part of a plurality of items of a matrix, the electronic system being configured to:

receive a pair of real numbers of two vectors, the pair corresponding to said item;

compute a stochastic representation of the real numbers resulting in two sets of bits, each set of bits comprising a subset of bits representing the corresponding real number and a sign bit indicative of a sign of the corresponding real number;

perform a multiplication operation by a sequence of digital operations using the two sets of bits to provide a representation of said item, the digital operations comprising an AND operation and a data formatting operation for mapping an output of the AND operation to the representation of said item; and a stochastic multiplier unit for each item of the at least part of the plurality of items for performing the sequence of digital operations, the stochastic multiplier unit comprising an XOR gate to perform an XOR operation between the sign bits of the sets of bits, an AND logic configured to perform the AND operation between the two subsets of bits, a count circuitry being configured to count a number of ones in a result of the AND operation, a multiplication circuit to multiply the count of ones by a predefined scale factor, and a sign converter to convert the sign of an output of the multiplication circuit based on sign of final product.

17. An electronic system for computing items of an outer product matrix, for each item of at least part of a plurality of items of a matrix, the electronic system being configured to:

receive a pair of real numbers of two vectors, the pair corresponding to said item;

compute a stochastic representation of the real numbers resulting in two sets of bits, each set of bits comprising a subset of bits representing the corresponding real number and a sign bit indicative of a sign of the corresponding real number;

perform a multiplication operation by a sequence of digital operations using the two sets of bits to provide a representation of said item, the digital operations comprising an AND operation and a data formatting operation for mapping an output of the AND operation to the representation of said item; and a stochastic multiplier unit for each item of the at least part of the plurality of items for performing the sequence of digital operations, the stochastic multiplier unit comprising an XOR gate to perform an XOR operation between the sign bits of the sets of bits, an AND logic configured to perform the AND operation between the two subsets of bits, a count circuitry being configured to count a number of ones in a result of the AND operation, a shift register to shift the count of ones by 2th power in a predefined scale factor or to shift the scale factor by the 2th power in the count and a sign converter to convert a sign of an output of the shift register based on sign of final product.

18. A method for computing items of an outer product matrix, for each item of at least part of the items of the matrix, the method comprising:
  receiving at an electronic system a pair of real numbers of two vectors, the pair corresponding to said item;
  computing by the electronic system a stochastic representation of the real numbers resulting in two sets of bits, each set of bits comprising a subset of bits representing the real number and a sign bit indicative of a sign of the real number; and
  performing by the electronic system a multiplication operation by a sequence of digital operations using the two sets of bits to provide a representation of said item, the digital operations comprising an AND operation and a data formatting operation for mapping a output of the AND operation to the representation of said item, the sequence of digital operations being performed by, for each item of the at least part of the plurality of items, two stochastic converters and a stochastic multiplier unit, wherein each of the stochastic converters is configured to perform the receiving of a respective real number of the pair of real numbers and the computation of the stochastic representation of the received real number, wherein the stochastic multiplier unit is configured to receive the two sets of bits to perform the sequence of digital operations, and wherein the stochastic multiplier unit comprises an AND logic configured to perform the AND operation between the two subsets of bits and a count circuit being configured to count a number of ones in a result of the AND operation, wherein the stochastic multiplier unit further comprises a multiplication circuit, the method further comprising, with the multiplication circuit, multiplying the count of ones by a predefined scale factor associated with an output of a logic operation between the sign bits of the sets of bits.

* * * * *